United States Patent
Marsico

(10) Patent No.: US 9,100,796 B2
(45) Date of Patent: Aug. 4, 2015

(54) METHODS, SYSTEMS, AND COMPUTER READABLE MEDIA FOR SEAMLESS ROAMING BETWEEN DIAMETER AND NON-DIAMETER NETWORKS

(71) Applicant: Tekelec, Inc., Morrisville, NC (US)

(72) Inventor: Peter J. Marsico, Chapel Hill, NC (US)

(73) Assignee: TEKELEC, INC., Morrisville, NC (US)

( * ) Notice: Subject to any disclaimer, the term of this patent is extended or adjusted under 35 U.S.C. 154(b) by 117 days.

(21) Appl. No.: 13/714,360

(22) Filed: Dec. 13, 2012

(65) Prior Publication Data

US 2013/0157620 A1  Jun. 20, 2013

Related U.S. Application Data

(60) Provisional application No. 61/576,213, filed on Dec. 15, 2011.

(51) Int. Cl.
*H04W 8/04* (2009.01)
*H04W 12/06* (2009.01)

(52) U.S. Cl.
CPC ............... *H04W 8/04* (2013.01); *H04W 12/06* (2013.01)

(58) Field of Classification Search
CPC ........ H04W 12/06; H04W 12/04; H04W 8/04
USPC ....................................... 455/432.1
See application file for complete search history.

(56) References Cited

U.S. PATENT DOCUMENTS

| | | |
|---|---|---|
| 4,310,727 A | 1/1982 | Lawser |
| 4,754,479 A | 6/1988 | Bicknell et al. |
| 5,089,954 A | 2/1992 | Rago |
| 5,237,604 A | 8/1993 | Ryan |
| 5,247,571 A | 9/1993 | Kay et al. |

(Continued)

FOREIGN PATENT DOCUMENTS

| | | |
|---|---|---|
| CN | ZL200680051295.9 | 3/2013 |
| EP | 0 512 962 A2 | 11/1992 |

(Continued)

OTHER PUBLICATIONS

Final Office Action for U.S. Appl. No. 13/035,656 (Feb. 12, 2013).

(Continued)

*Primary Examiner* — Nathan Mitchell
(74) *Attorney, Agent, or Firm* — Jenkins, Wilson, Taylor & Hunt, P.A.

(57) ABSTRACT

Methods, systems, and computer readable media for seamless roaming between networks are disclosed. According to one aspect, the subject matter described herein includes a method for seamless roaming between networks. The method occurs at a home subscriber server (HSS). The method includes maintaining registration status information for a subscriber. The method also includes communicating with a first network via a first network interface and with a second network via a second network interface using the registration status information to facilitate roaming between the first network and the second network. The first network interface is configured to receive and send Diameter signaling messages for managing mobility of the subscriber and the second network interface is configured to receive and send non-Diameter signaling messages for managing mobility of the subscriber.

21 Claims, 9 Drawing Sheets

(56) References Cited

U.S. PATENT DOCUMENTS

| | | |
|---|---|---|
| 5,251,248 A | 10/1993 | Tokunaga et al. |
| 5,400,390 A | 3/1995 | Salin |
| 5,420,916 A | 5/1995 | Sekiguchi |
| 5,422,941 A | 6/1995 | Hasenauer et al. |
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |
| 5,457,736 A | 10/1995 | Cain et al. |
| 5,475,732 A | 12/1995 | Pester, III |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,812,639 A | 9/1998 | Bartholomew et al. |
| 5,819,178 A | 10/1998 | Cropper |
| 5,822,694 A | 10/1998 | Coombes et al. |
| 5,832,382 A | 11/1998 | Alperovich |
| 5,841,854 A | 11/1998 | Schumacher et al. |
| 5,852,660 A | 12/1998 | Lindquist et al. |
| 5,854,982 A | 12/1998 | Chambers et al. |
| 5,862,481 A | 1/1999 | Kulkarni et al. |
| 5,867,788 A | 2/1999 | Joensuu |
| 5,878,347 A | 3/1999 | Joensuu et al. |
| 5,878,348 A | 3/1999 | Foti |
| 5,889,849 A | 3/1999 | Ban et al. |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichannie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,094,578 A | 7/2000 | Purcell et al. |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,130,939 A | 10/2000 | Cochinwala et al. |
| 6,134,441 A | 10/2000 | Åström et al. |
| 6,134,447 A | 10/2000 | Havinis et al. |
| 6,137,806 A | 10/2000 | Martinez |
| 6,138,007 A | 10/2000 | Bharatia |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,175,743 B1 | 1/2001 | Alperovich et al. |
| 6,178,181 B1 | 1/2001 | Glitho |
| 6,192,242 B1 | 2/2001 | Rollender |
| 6,205,210 B1 | 3/2001 | Rainey et al. |
| 6,208,870 B1 | 3/2001 | Lorello et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,292,669 B1 | 9/2001 | Meuronen et al. |
| 6,298,232 B1 | 10/2001 | Marin et al. |
| 6,308,075 B1 | 10/2001 | Irten et al. |
| 6,324,279 B1 | 11/2001 | Kalmanek et al. |
| 6,327,350 B1 | 12/2001 | Spangler et al. |
| 6,338,140 B1 | 1/2002 | Owens et al. |
| 6,356,529 B1 | 3/2002 | Zarom |
| 6,363,431 B1 | 3/2002 | Hammer et al. |
| 6,377,674 B1 | 4/2002 | Chong et al. |
| 6,377,807 B1 | 4/2002 | Iparrea et al. |
| 6,411,632 B2 | 6/2002 | Lindgren et al. |
| 6,421,674 B1 | 7/2002 | Yoakum et al. |
| 6,424,832 B1 | 7/2002 | Britt et al. |
| 6,434,127 B1 | 8/2002 | Ha |
| 6,453,174 B1 | 9/2002 | Cunningham et al. |
| 6,463,055 B1 | 10/2002 | Lupien et al. |
| 6,493,551 B1 | 12/2002 | Wang et al. |
| 6,505,046 B1 | 1/2003 | Baker |
| 6,512,926 B1 | 1/2003 | Henry-Labordere |
| 6,515,997 B1 | 2/2003 | Feltner et al. |
| 6,519,242 B1 | 2/2003 | Emery et al. |
| 6,519,468 B1 | 2/2003 | Donovan et al. |
| 6,529,524 B1 | 3/2003 | Liao et al. |
| 6,535,746 B1 | 3/2003 | Yu et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 | 8/2003 | Pirkola et al. |
| 6,615,037 B1 | 9/2003 | Bharatia et al. |
| 6,625,461 B1 | 9/2003 | Bertacchi |
| 6,643,511 B1 | 11/2003 | Rune et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,697,620 B1 | 2/2004 | Lamb et al. |
| 6,731,926 B1 | 5/2004 | Link, II et al. |
| 6,738,636 B2 | 5/2004 | Lielbriedis |
| 6,745,041 B2 | 6/2004 | Allison et al. |
| 6,795,701 B1 | 9/2004 | Baker et al. |
| 6,801,781 B1 | 10/2004 | Provost et al. |
| 6,819,932 B2 | 11/2004 | Allison et al. |
| 6,826,397 B1 | 11/2004 | Vasa |
| 6,836,477 B1 | 12/2004 | West, Jr. et al. |
| 6,850,768 B2 | 2/2005 | Foll |
| 6,865,191 B1 | 3/2005 | Bengtsson et al. |
| 6,885,872 B2 | 4/2005 | McCann et al. |
| 6,912,389 B2 | 6/2005 | Bright et al. |
| 6,917,612 B2 | 7/2005 | Foti et al. |
| 6,950,441 B1 | 9/2005 | Kaczmarczyk et al. |
| 6,993,038 B2 | 1/2006 | McCann |
| 7,035,239 B2 | 4/2006 | McCann et al. |
| 7,039,037 B2 | 5/2006 | Wang et al. |
| 7,043,002 B2 | 5/2006 | Delaney et al. |
| 7,079,524 B2 | 7/2006 | Bantukul et al. |
| 7,079,853 B2 | 7/2006 | Rathnasabapathy et al. |
| 7,092,505 B2 | 8/2006 | Allison et al. |
| 7,113,795 B2 | 9/2006 | Somani et al. |
| 7,113,800 B2 | 9/2006 | Linkola |
| 7,145,875 B2 | 12/2006 | Allison et al. |
| 7,177,398 B2 | 2/2007 | Meer et al. |
| 7,177,399 B2 | 2/2007 | Dawson et al. |
| 7,181,194 B2 | 2/2007 | McCann et al. |
| 7,190,959 B2 | 3/2007 | Palmer et al. |
| 7,221,929 B2 | 5/2007 | Lee et al. |
| 7,221,952 B2 | 5/2007 | Cho et al. |
| 7,257,401 B1 | 8/2007 | Dizdarevic et al. |
| 7,274,683 B2 | 9/2007 | Segal |
| 7,286,839 B2 | 10/2007 | McCann et al. |
| 7,292,592 B2 | 11/2007 | Rune |
| 7,366,945 B2 | 4/2008 | Wang et al. |
| 7,397,773 B2 | 7/2008 | Qu et al. |
| 7,453,876 B2 | 11/2008 | Hua et al. |
| 7,551,608 B1 | 6/2009 | Roy |
| 7,583,646 B2 | 9/2009 | Hua et al. |
| 7,627,331 B2 | 12/2009 | Winterbottom et al. |
| 7,668,543 B2 | 2/2010 | Müller |
| 7,729,485 B2 | 6/2010 | Koskinen et al. |
| 7,746,864 B1 | 6/2010 | Asawa et al. |
| 7,801,116 B2 | 9/2010 | Westman |
| 7,844,745 B1 | 11/2010 | Darbyshire et al. |
| 7,848,767 B2 | 12/2010 | McCann et al. |
| 7,889,716 B2 | 2/2011 | Tejani et al. |
| 7,894,353 B2 | 2/2011 | Li et al. |
| 7,916,857 B2 | 3/2011 | Palmer et al. |
| 7,962,120 B2 | 6/2011 | Cai et al. |
| 8,041,349 B2 | 10/2011 | Fukui et al. |

(56) References Cited

U.S. PATENT DOCUMENTS

| | | | |
|---|---|---|---|
| 8,175,236 B2 | 5/2012 | Pandey et al. |
| 8,194,634 B2 | 6/2012 | Delker et al. |
| 8,195,161 B2 | 6/2012 | Bumiller |
| 8,208,461 B2 | 6/2012 | Mitchell |
| 8,380,209 B1 | 2/2013 | Sylvain |
| 8,391,833 B2 | 3/2013 | Agarwal |
| 8,644,355 B2 | 2/2014 | Agarwal et al. |
| 8,750,292 B2 | 6/2014 | Agarwal et al. |
| 8,855,654 B2 | 10/2014 | Agarwal |
| 2001/0006897 A1 | 7/2001 | Kang et al. |
| 2001/0029182 A1 | 10/2001 | McCann et al. |
| 2001/0030957 A1 | 10/2001 | McCann et al. |
| 2001/0040957 A1 | 11/2001 | McCann et al. |
| 2001/0046856 A1 | 11/2001 | McCann |
| 2002/0132636 A1 | 9/2002 | Stockhusen |
| 2002/0147845 A1 | 10/2002 | Sanchez-Herrero et al. |
| 2002/0173320 A1 | 11/2002 | Aitken et al. |
| 2002/0176382 A1 | 11/2002 | Madour et al. |
| 2003/0003930 A1 | 1/2003 | Allison et al. |
| 2003/0007482 A1 | 1/2003 | Khello et al. |
| 2003/0016684 A1 | 1/2003 | Prasad et al. |
| 2003/0026289 A1 | 2/2003 | Mukherjee et al. |
| 2003/0054844 A1 | 3/2003 | Anvekar et al. |
| 2003/0061234 A1 | 3/2003 | Ali et al. |
| 2003/0065788 A1 | 4/2003 | Salomaki |
| 2003/0081754 A1 | 5/2003 | Esparza et al. |
| 2003/0109271 A1 | 6/2003 | Lewis et al. |
| 2003/0157938 A1 | 8/2003 | Haase et al. |
| 2003/0193967 A1 | 10/2003 | Fenton et al. |
| 2003/0227899 A1 | 12/2003 | McCann |
| 2004/0076126 A1 | 4/2004 | Qu et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0125925 A1 | 7/2004 | Marsot |
| 2004/0132451 A1 | 7/2004 | Butehorn et al. |
| 2004/0142707 A1 | 7/2004 | Midkiff et al. |
| 2004/0198351 A1 | 10/2004 | Knotts |
| 2004/0202187 A1 | 10/2004 | Kelly et al. |
| 2004/0203914 A1 | 10/2004 | Kall et al. |
| 2004/0219935 A1 | 11/2004 | McCann et al. |
| 2004/0246965 A1 | 12/2004 | Westman et al. |
| 2004/0264674 A1 | 12/2004 | Delaney et al. |
| 2005/0003838 A1 | 1/2005 | McCann et al. |
| 2005/0111641 A1 | 5/2005 | Koskinen et al. |
| 2005/0119017 A1 | 6/2005 | Lovell, Jr. et al. |
| 2005/0238048 A1 | 10/2005 | Delaney et al. |
| 2006/0034256 A1 | 2/2006 | Addagatla et al. |
| 2006/0067338 A1 | 3/2006 | Hua et al. |
| 2006/0079236 A1 | 4/2006 | Del Pino et al. |
| 2006/0098621 A1 | 5/2006 | Plata et al. |
| 2006/0136557 A1 | 6/2006 | Schaedler et al. |
| 2006/0281492 A1 | 12/2006 | Jiang |
| 2007/0061397 A1 | 3/2007 | Gregorat et al. |
| 2007/0066326 A1 | 3/2007 | Agarwal et al. |
| 2007/0104184 A1 | 5/2007 | Ku et al. |
| 2007/0133574 A1 | 6/2007 | Tejani et al. |
| 2007/0209061 A1 | 9/2007 | Dekeyzer et al. |
| 2007/0254681 A1 | 11/2007 | Horvath et al. |
| 2007/0258575 A1 | 11/2007 | Douglas et al. |
| 2007/0288655 A1 | 12/2007 | Price et al. |
| 2007/0297419 A1 | 12/2007 | Askerup et al. |
| 2008/0039104 A1 | 2/2008 | Gu et al. |
| 2008/0176538 A1 | 7/2008 | Terrill et al. |
| 2008/0198862 A1 | 8/2008 | Bantukul et al. |
| 2008/0233931 A1 | 9/2008 | Shim |
| 2008/0248820 A1 | 10/2008 | Lohtia |
| 2009/0003388 A1 | 1/2009 | Florkey et al. |
| 2009/0129372 A1 | 5/2009 | Pandey et al. |
| 2009/0227276 A1 | 9/2009 | Agarwal et al. |
| 2009/0232011 A1 | 9/2009 | Li et al. |
| 2010/0113016 A1 | 5/2010 | Gayde et al. |
| 2010/0217858 A1 | 8/2010 | Przybysz et al. |
| 2010/0250662 A1 | 9/2010 | Agarwal et al. |
| 2010/0278041 A1 | 11/2010 | Shi |
| 2010/0299451 A1 | 11/2010 | Yigang et al. |
| 2010/0331023 A1 | 12/2010 | Cai et al. |
| 2011/0067085 A1 | 3/2011 | Brouard |
| 2011/0211527 A1 | 9/2011 | Agarwal et al. |
| 2011/0222532 A1 | 9/2011 | Noldus |
| 2012/0034900 A1 | 2/2012 | Agarwal |
| 2012/0127926 A1* | 5/2012 | Drevon et al. ............... 370/328 |
| 2012/0163297 A1 | 6/2012 | Agarwal et al. |
| 2012/0179827 A1 | 7/2012 | Xue et al. |
| 2012/0202550 A1 | 8/2012 | Marsico |
| 2012/0224524 A1 | 9/2012 | Marsico |
| 2012/0224563 A1 | 9/2012 | Zisimopoulous et al. |
| 2012/0287844 A1 | 11/2012 | Ophir et al. |
| 2013/0065606 A1* | 3/2013 | Kurokawa et al. ......... 455/456.1 |
| 2013/0155948 A1* | 6/2013 | Pinheiro et al. ............. 370/328 |
| 2014/0213265 A1 | 7/2014 | Agarwal |

FOREIGN PATENT DOCUMENTS

| | | | |
|---|---|---|---|
| EP | 0 788 283 A2 | 8/1997 |
| EP | 0 936 825 A3 | 8/1999 |
| EP | 0 944 276 A1 | 9/1999 |
| EP | 1 558 004 A | 7/2005 |
| EP | 1 742 452 A1 | 1/2007 |
| EP | 1 950 942 A1 | 7/2008 |
| KR | 10-2004-0107271 A | 12/2004 |
| WO | WO 95/12292 A1 | 5/1995 |
| WO | WO 96/11557 | 4/1996 |
| WO | WO 97/33441 A1 | 9/1997 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 01/47297 A2 | 6/2001 |
| WO | WO 01/48981 A1 | 7/2001 |
| WO | WO 01/54444 A1 | 7/2001 |
| WO | WO 02/060192 A2 | 8/2002 |
| WO | WO 03/005664 A2 | 1/2003 |
| WO | WO 03/021982 A1 | 3/2003 |
| WO | WO 03/105382 A1 | 12/2003 |
| WO | WO 2004/006534 | 1/2004 |
| WO | WO 2004/008786 A1 | 1/2004 |
| WO | WO 2004/075507 | 9/2004 |
| WO | WO 2004/102345 A2 | 11/2004 |
| WO | WO 2005/002311 A2 | 1/2005 |
| WO | WO 2005/013538 A3 | 2/2005 |
| WO | WO 2006/072473 A1 | 7/2006 |
| WO | WO 2007/045991 A1 | 4/2007 |
| WO | WO 2007/064943 A2 | 6/2007 |
| WO | WO 2007/092205 A2 | 8/2007 |
| WO | WO 2007/146257 A2 | 12/2007 |
| WO | WO 2008/157213 A2 | 12/2008 |
| WO | WO 2009/023573 A2 | 2/2009 |
| WO | WO 2010/111561 A2 | 9/2010 |
| WO | WO2011089819 * | 7/2011 ............. H04W 4/06 |
| WO | WO 2011/106690 A2 | 9/2011 |
| WO | WO 2012/088497 A1 | 6/2012 |

OTHER PUBLICATIONS

First Examination Report for Indian Application No. 3231/CHENP/2008 (Jan. 2, 2013).

Non-Final Office Action for U.S. Appl. No. 13/336,132 (Dec. 18, 2012).

Non-Final Office Action for U.S. Appl. No. 12/732,178 (Nov. 6, 2012).

Non-Final Official Action for U.S. Appl. No. 13/035,656 (Aug. 23, 2012).

Notification of Transmittal of the International Search Report and the Written Opinion of the International Searching Authority, or the Declaration for International Application No. PCT/US2011/067130 (Jun. 7, 2012).

Non-Final Offcial Action for U.S. Appl. No. 13/035,656 (Jan. 18, 2012).

Notification of Transmittal of the International Search Report and the Written Opinion of the International Searching Authority, or the Declaration for International Application No. PCT/US2011/026307 (Nov. 15, 2011).

(56) References Cited

OTHER PUBLICATIONS

Communication under Rule 71(3) EPC for European Application No. 06 844 747.3 (Jul. 19, 2011).
Chinese Official Action for Chinese Patent Application No. 200680051295.9 (Dec. 24, 2010).
Notification of Transmittal of the International Search Report and the Written Opinion of the International Searching Authority, or the Declaration for International Application No. PCT/US2010/028762 (Oct. 27, 2010).
Notice of Allowance and Fee(s) Due for U.S. Appl. No. 11/291,502 (Oct. 5, 2010).
Notice of Allowance and Fee(s) Due for U.S. Appl. No. 10/405,859 (Aug. 5, 2010).
U.S. Appl. No. 61/291,961 for "A GTP Relay for Direct Internet Access from the Roaming Mobile Network and Other Services," (Unpublished, filed Jan. 4, 2010).
Notice of Allowance and Fee(s) Due for U.S. Appl. No. 11/706,837 (May 27, 2010).
Communication Pursuant to Article 94(3) EPC for European Application No. 06844747.3 (May 11, 2010).
Notice of Allowance and Fee(s) Due for U.S. Appl. No. 10/405,859 (Mar. 9, 2010).
Final Official Action for U.S. Appl. No. 11/291,502 (Feb. 4, 2010).
"Diameter (Protocol)," Wikipedia, pp. 1-8 (Document last modified on Jan. 16, 2010).
Final Official Action for U.S. Appl. No. 11/706,837 (Dec. 15, 2009).
Korhonen et al., "Clarifications on the Routing of Diameter Requests Based on the Username and the Realm," RFC 5729, pp. 1-12 (Dec. 2009).
Interview Summary for U.S. Appl. No. 11/706,837 (Oct. 26, 2009).
Korhonen et al., "Diameter User-Name and Realm Based Request Routing Clarifications," draft-ietf-dime-nai-routing-04.txt, pp. 1-13 (Oct. 6, 2009).
Official Action for U.S. Appl. No. 10/405,859 (Aug. 3, 2009).
Communication pursuant to Article 94(3) EPC for European application No. 06844747.3 (Jul. 28, 2009).
Official Action for U.S. Appl. No. 11/706,837 (May 13, 2009).
Official Action for U.S. Appl. No. 11/291,502 (May 13, 2009).
Supplementary European Search Report for European Application No. 06844747.3 (Apr. 24, 2009).
Final Official Action for U.S. Appl. No. 10/405,859 (Jan. 6, 2009).
3GPP, "Digital Cellular Telecommunications System (Phase 2+); Universal Mobile Telecommunications System (UMTS); LTE; IP Multimedia (IM) Subsystem Cx and Dx Interfaces; Signalling Flows and Message Contents," ETSI TS 129 228 V8.4.0 (Jan. 2009).
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US2006/046108 (Sep. 9, 2008).
Interview Summary for U.S. Appl. No. 10/405,859 (Aug. 20, 2008).
Official Action for U.S. Appl. No. 11/706,837 (Jul. 29, 2008).
Communication of European publication number and information on the application of Article 67(3) EPC for Application No. 06844747.3 (Jul. 23, 2008).
Notification of Transmittal of the International Search Report and the Written Opinion of the International Searching Authority, or the Declaration for International Application No. PCT/US07/041 75 (Jul. 22, 2008).
Official Action for U.S. Appl. No. 10/405,859 (Mar. 17, 2008).
Restriction Requirement for U.S. Appl. No. 10/405,859 (Feb. 6, 2008).
"3rd Generation Partnership Project; Technical Specifications Group Service and System Aspects; Telecommunication management; Charging management; Diameter charging applications (Release 7)," 3GPP TS 32.299, V7.7.0, pp. 1-120 (Sep. 2007).
"IP Multimedia Subsystem," printout from wikipedia.org, Wikimedia Foundation, Inc. (May 29, 2007).
Supplementary European Search Report for European application No. 04 756 094.1 (Mar. 29, 2007).
"HP OpenCall Home Subscriber Server Software—Data Sheet", 4AA0-3360ENW Rev. 2, Hewlett-Packard Development Company, L.P. (Jul. 2006).
Camarillo et al., "The Session Initiation Protocol (SIP) P-User-Database Private-Header (P-Header)," Network Working Group, RFC 4457, pp. 1-8 (Apr. 2006).
Liu et al., "Introduction to Diameter," IBM, pp. 1-12 (Jan. 24, 2006).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
International Search Report in PCT Application No. 03/32626 (Mar. 5, 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Barry, "A Signal for Savings," Packet, Cisco Systems Users Magazine, vol. 14, No. 4, pp. Cover; 19-21; and 81 (Fourth Quarter 2002).
"Agilent Technologies and Cisco Systems SS7 Over IP White Paper," Cisco Systems, Inc. and Agilent and Technologies, pp. 1-6 (Copyright 2002-Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business Intelligence," Agilent Technologies, pp. 1-6 (Copyright 2001-Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Rockhold, "Or," Wireless Review, p. 22, 23, 26, 28, 30, 32, (Aug. 15, 2000).
Bertrand, "Jambala Mobility Gateway-Convergence and Inter-System Roaming," Ericsson Review, p. 89-93 (1999).
"Topsail Beach-SS7 Over IP-" Cisco Systems, Inc., pp. 1-16 (Copyright 1999).
ETSI, "Digital Cellular Telecommunications Systems (Phase 2+); Support of Mobile Number Portability (MNP); Technical Realisation; Stage 2," Global System for Mobile Communications, p. 1-71, (1998).

(56) References Cited

OTHER PUBLICATIONS

Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7-Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for No. Portability," AT&T Network Systems, No. 1, p. 1-75, (Feb. 2, 1996).
ETSI, Digital Cellular Telecommunications System (Phase 2+); Mobile Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN and intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network interface Specification (CCSNIS) Supporting SCCP and TCAP," Bell Communications Research, p. ii-xii, 1-1-C-22, (Mar. 1994).
Buckles, "Very High Capacity Signaling Trnsfer Point for Intelligent Network Servcies," DSC Communciations Corporation, p. 1308-1311, (1988).
"Diameter Overview," referenced from www.ulticom.com/html/products/signalware-diameter-reference-guide.asp (Publication date unknown).
"Chapter 1: Overview," SS7 Port Adapter Installation and Configuration, pp. 1-1-1-8 (Publication Date Unknown).
"Configuring ITP Basic Functionality," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Non-Final Office Action for U.S. Appl. No. 13/035,656 (Oct. 9, 2013).
Communication of European publication number and information on the application of Article 67(3) EPC for European Application No. 11852129.3 (Oct. 2, 2013).
Applicant-Initiated Interview Summary for U.S. Appl. No. 12/732,178 (Sep. 26, 2013).
Notice of Allowance and Fee(s) Due for U.S. Appl. No. 13/336,132 (Sep. 23, 2013).
Second Examination Report for Indian Application No. 3231/CHENP/2008 (Aug. 6, 2013).
Final Office Action for U.S. Appl. No. 12/732,178 (Jun. 17, 2013).
Notice of Allowance and Fee(s) Due for U.S. Appl. No. 13/336,132 (May 20, 2013).
Applicant-Initiated Interview Summary for U.S. Appl. No. 13/035,656 (May 17, 2013).
Commonly-assigned, co-pending U.S. Appl. No. 13/752,369 for "Methods, Systems, and Computer Readable Media for Tracking and Communicating Long Term Evolution (LTE) Handset Communication Capability" (Unpublished, filed Jan. 28, 2013).
Calhoun et al., "Diameter Base Protcol," Network Working Group, RFC 3588 (Sep. 2003).
Notice of Allowance and Fee(s) and Interview Summary Due for U.S. Appl. No. 12/732,178 (Dec. 16, 2014).
Hearing Notice for Indian Patent Application No. 3231/CHENP/2008 (Nov. 20, 2014).
Non-Final Office Action for U.S. Appl. No. 12/732,178 (Jun. 26, 2014).
Notice of Allowance and Fee(s) Due for U.S. Appl. No. 13/752,369 (Jun. 10, 2014).
Notice of Allowance and Fee(s) Due for U.S. Appl. No. 13/035,656 (Jan. 31, 2014).
Applicant-Initiated Interview Summary for U.S. Appl. No. 13/035,656 (Jan. 14, 2014).
Chinese Official Action for Chinese Patent Application No. 200680051295.9 (Mar. 20, 2012).
Chinese Official Action for Chinese Patent Application No. 200680051295.9 (Oct. 9, 2011).

* cited by examiner

METHODS, SYSTEMS, AND COMPUTER READABLE MEDIA FOR SEAMLESS ROAMING BETWEEN DIAMETER AND NON-DIAMETER NETWORKS

PRIORITY CLAIM

This application claims the benefit of U.S. Provisional Patent Application Ser. No 61/576,213, filed Dec. 15, 2011, the disclosure of which is incorporated herein by reference in its entirety.

TECHNICAL FIELD

The subject matter described herein relates to methods and systems for subscriber mobility. More particularly, the subject matter described herein relates to methods, systems, and computer readable media for seamless roaming between Diameter and non-Diameter networks.

BACKGROUND

Diameter is an authentication, authorization and accounting (AAA) protocol for computer networks, and is a successor to Radius. The Diameter base protocol is defined in International Engineering Task Force (IETF) request for comments (RFC) 3588 which is incorporated by reference herein in its entirety. Diameter messages use a per user framework and exist in the format of request-answer messages. Diameter answer messages travel back to the request source via the same path through which the request message was routed using hop-by-hop transport.

Some next generation networks, such as long term evolution (LTE) networks or 4G networks, use Diameter messages for performing various functions, such as subscriber mobility procedures and authentication. For example, an LTE network may include a mobility management entity (MME) and a home subscriber server (HSS) may interact for authentication, authorization, and/or accounting (AAA) purposes. In this example, one or more Diameter messages may be communicated between the two nodes when performing authentication or a mobility procedure (e.g., a handover).

Some networks are not designed or configured to use Diameter messages. For example, non-Diameter networks, such as 3G networks (e.g., global system for mobile communications (GSM) networks or universal mobile telecommunications systems (UTMS) networks), may use non-Diameter messages, such as a mobile application part (MAP) message, to communicate mobility information between an SGSN and HLR. Since non-Diameter networks still play an important role in many service providers' networks, it is important for interworking solutions between Diameter networks and non-Diameter networks to be efficient and scalable.

Accordingly, there exists a need for methods, systems, and computer readable media for seamless roaming between Diameter and non-Diameter networks.

SUMMARY

Methods, systems, and computer readable media for seamless roaming between networks are disclosed. According to one aspect, the subject matter described herein includes a method for seamless roaming between networks. The method occurs at a home subscriber server (HSS). The method includes maintaining registration status information for a subscriber. The method also includes communicating with a first network via a first network interface and with a second network via a second network interface using the registration status information to facilitate roaming between the first network and the second network. The first network interface is configured to receive and send Diameter signaling messages for managing mobility of the subscriber and the second network interface is configured to receive and send non-Diameter signaling messages for managing mobility of the subscriber.

According to another aspect, the subject matter described herein includes a system for seamless roaming between networks. The system includes a home subscriber server (HSS). The HSS includes at least one processor and a memory. The HSS also includes a first network interface configured to receive and send Diameter signaling messages for managing mobility of the subscriber in a first network and a second network interface configured to receive and send non-Diameter signaling messages for managing mobility of the subscriber in a first network. The HSS is configured to maintain registration status information for a subscriber and to communicate with the first network via the first network interface and with the second network via the second network interface using the registration status information to facilitate roaming between the first network and the second network.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for seamless roaming between networks. Advantageously, aspects of the present subject matter described herein can be used for roaming between Diameter networks (e.g., LTE networks) and non-Diameter network (3G networks). For example, a subscriber data management node (SDMN), such as a home subscriber server (HSS), in accordance with aspects of the subject matter described herein may perform mobility management actions (including authentication procedures) in both Diameter networks and non-Diameter networks. In some embodiments, a Diameter SDMN may convert Diameter messages associated with mobility management to non-Diameter messages and vice versa. In some embodiment, a Diameter SDMN may act as a proxy to a non-Diameter SDMN (e.g., a home location register (HLR) in a non-Diameter network) and may initiate or trigger the non-Diameter SDMN to perform mobility management actions on behalf of a subscriber or associated user equipment (UE).

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
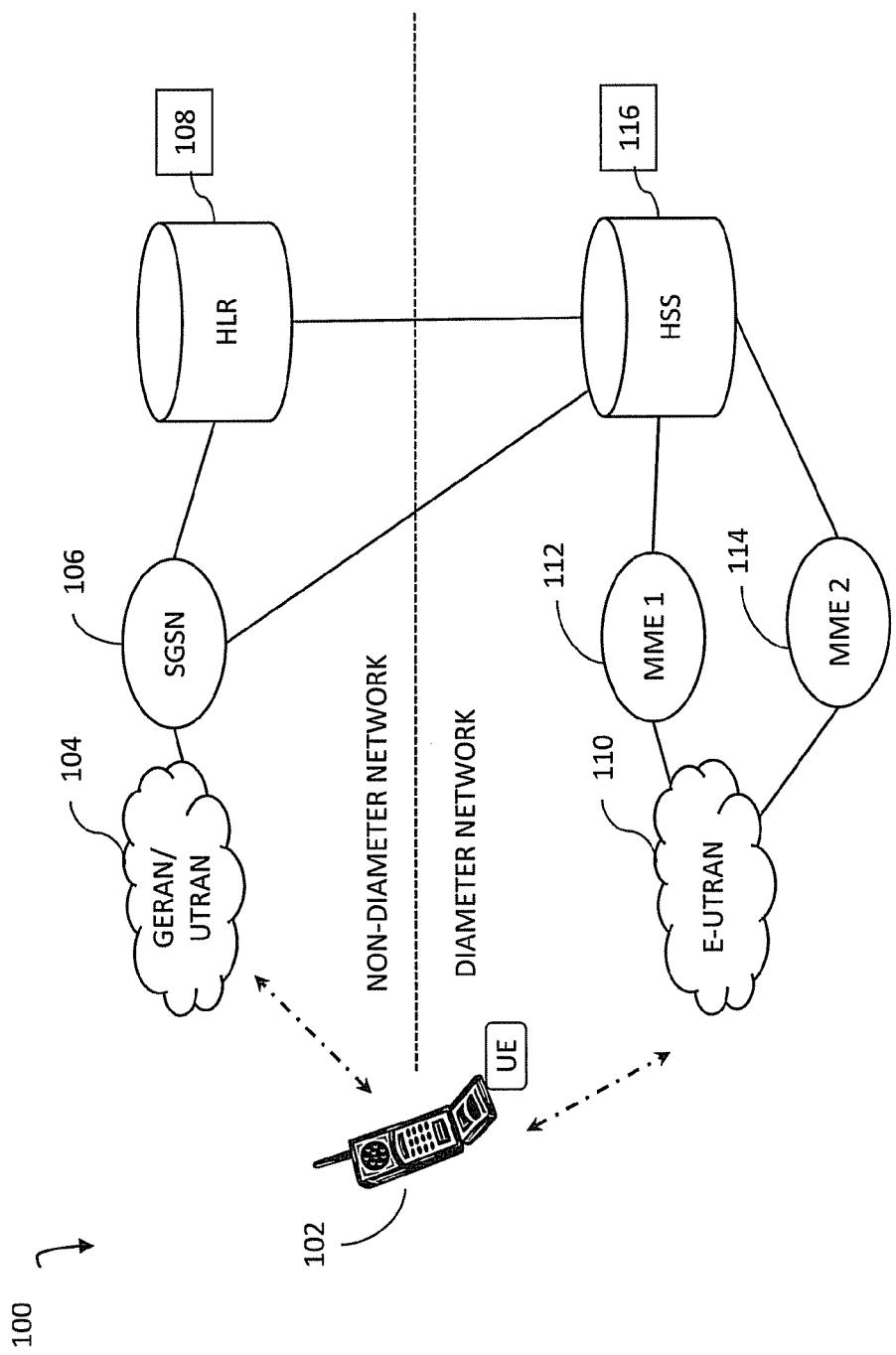
FIG. 1 is a diagram illustrating roaming between networks according to an embodiment of the subject matter described herein.

FIG. 1 is a diagram illustrating roaming between networks according to an embodiment of the subject matter described herein. FIG. 1 includes a UE 102 (e.g., a mobile device, a tablet computing platform, or a smartphone) capable of roaming or moving between different portions of a network 100. Network 100 may include networks that use different standards and/or protocols. For example, network 100 may include a Diameter network (e.g., an LTE network) and a non-Diameter network (e.g., a GSM or UTMS network).

Non-Diameter network may include a UMTS terrestrial radio access network (UTRAN) or a global system for mobile communications (GSM) enhanced data rates for GSM evolution (EDGE) radio access network (GERAN), referred to as UTRAN/GERAN 104 and various nodes, including one or more serving general packet radio service (GPRS) support node (SGSN) 106, and HLR 108. UTRAN/GERAN 104 may represent a radio access network and may include various nodes for communicating with UE 102 and elements within a core network. Exemplary nodes in UTRAN/GERAN 104 may include a Node B (NBs) or other transceiver nodes, which performs radio access functions in UTRAN/GERAN 104. UTRAN/GERAN 104, or nodes therein, may be used for communications between UE 102 and nodes in the non-Diameter network or other networks. For example, an NB or other node (e.g., a gateway) may communicate UE-related messages (e.g., authentication or mobility related messages) to an SGSN or other nodes.

SGSN 106 may represent any suitable entity for performing one or more mobility management functions, such as tracking UE 102. In some embodiments, SGSN 106 may communicate information (e.g., mobility-related information) to other nodes in network 100. For example, SGSN 106 may receive registration requests from a transceiver node in UTRAN/GERAN 104 and may communicate with HLR 108 or HSS 116 for performing authentication and/or for updating the current location of the subscriber. Additionally, SGSN 106 may communicate with various other nodes and perform various other functions.

HLR 108 may represent any suitable entity for maintaining and/or providing one or more subscriber data management (SDM) functions. HLR 108 may maintain subscriber-related information, such as user identification, control information for user authentication and authorization, location information, and user profile data. For example, HLR 108 may include a database containing details about a subscriber identity module (SIM) card associated with UE 102, services available to UE 102, and the current location (e.g., current serving node) of UE 102.

In some embodiments, HLR 108 may perform mobility management procedures in response to receiving MAP or other non-Diameter messages. Mobility management messages may be received from SGSN 106 or HSS 116. When receiving mobility management messages from HSS 116, HLR 108 may perceive HSS 116 as a SGSN and may provide corresponding response messages.

Diameter network may include an evolved universal mobile telecommunications system (UMTS) terrestrial radio access network (E-UTRAN) 110 and various nodes, including one or more mobility management entities (MMEs), and HSS 116. E-UTRAN 110 may represent a radio access network and may include various nodes for communicating with UE 102 and elements within a core network. Exemplary nodes in E-UTRAN 110 may include an evolved Node Bs (eNBs) or other transceiver nodes, which performs radio access functions in E-UTRAN 110. E-UTRAN 110, or nodes therein, may be used for communications between UE 102 and nodes in the Diameter network or other networks. For example, an eNB or other node may communicate UE-related messages to an MME or other nodes.

MME 1 112 and MME 2 114 may represent suitable entities for performing one or more mobility management functions, such as tracking UE 102. In some embodiments, MME 1 112 and MME 2 114 may communicate information (e.g., mobility-related information) to other nodes in network 100. For example, MME 1 112 may receive registration requests from a transceiver node in E-UTRAN 110 and may communicate with HSS 116 for performing authentication and/or for updating the current location of the subscriber. Additionally, MME 1 112 and MME 2 114 may communicate with various other nodes and perform various other functions.

HSS 116 may represent any suitable entity for maintaining and/or providing one or more SDM functions. HSS 116 may maintain subscriber-related information, such as user identification, control information for user authentication and authorization, location information, and user profile data. For example, HSS 116 may include a database containing details about a subscriber associated with UE 102, services available to UE 102, and the current location (e.g., current serving node) of UE 102.

In some embodiments, HSS 116 may perform or facilitate mobility management procedures in response to receiving various messages, such as Diameter messages or non-Diameter messages. For example, HSS 116 may be configured to handle various mobility management functions in a Diameter network and/or non-Diameter network. HSS 116 may be capable of converting Diameter messages to non-Diameter messages and also capable of converting non-Diameter messages to Diameter messages. In scenarios where a subscriber's profile is associated with HLR 108, HSS 116 may be configured to interact with HLR 108 in effecting or facilitating mobility management procedure across Diameter and non-Diameter networks.

In some embodiments, HSS 116 may be configured to act as a proxy for HLR 108. For example, HSS 116 may receive Diameter messages associated with UE 102 from nodes in a Diameter network, convert the Diameter messages to corresponding MAP messages, and send them to HLR 108. In response to receiving the MAP messages, HLR 108 may perform mobility management functions for UE 102.

Figure 2:
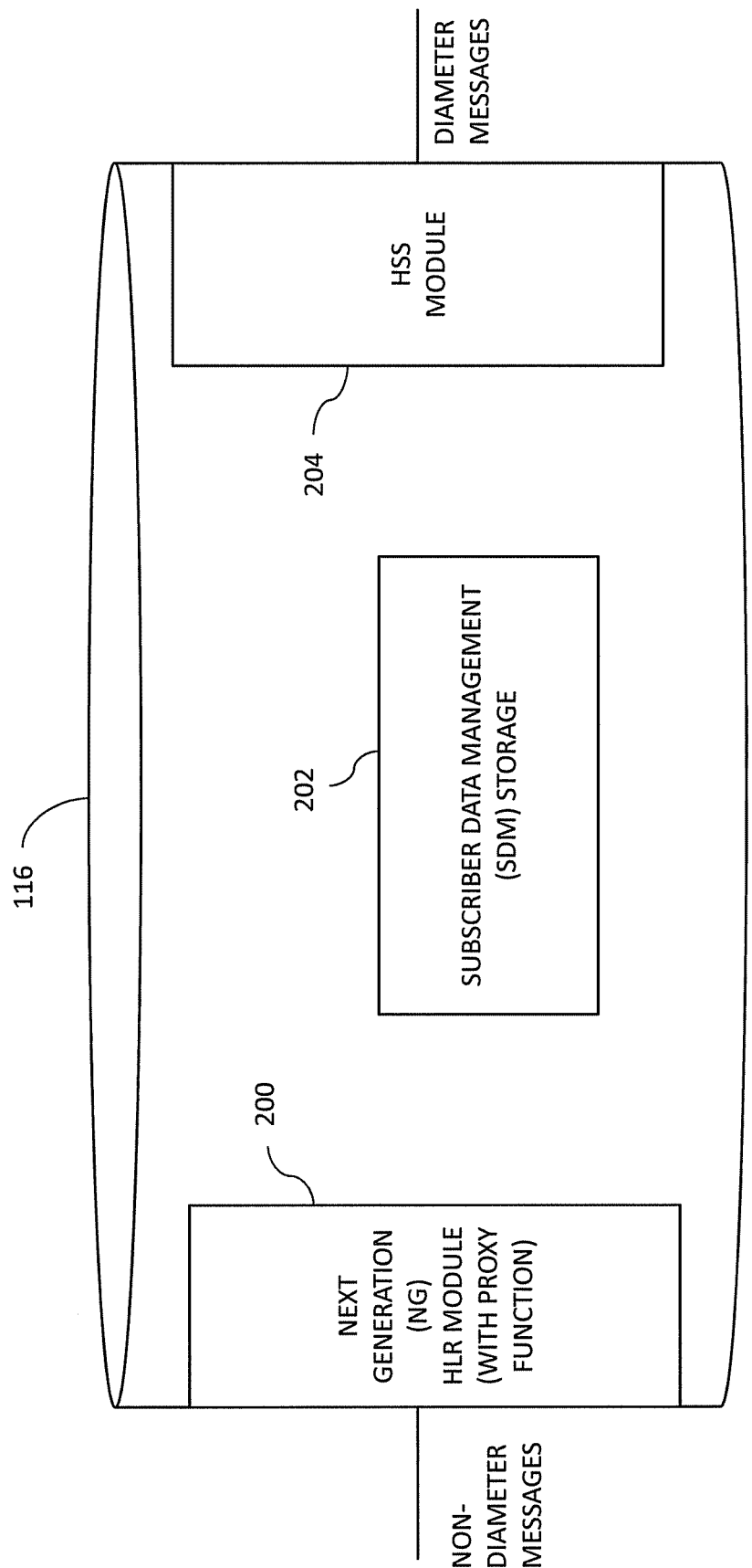
FIG. 2 is a diagram illustrating an exemplary home subscriber server according to an embodiment of the subject matter described herein.

FIG. 2 is a diagram illustrating an exemplary HSS 116 according to an embodiment of the subject matter described herein. Exemplary HSS 116 may be an SDMN or any suitable entity for providing one or more aspects associated with SDM. For example, HSS 116 may include one or more modules or components for providing or supporting bi-directional, seamless mobility between non-Diameter (e.g., 3G) and Diameter (e.g., LTE) networks.

In some embodiments, HSS 116 may include a next generation (NG) HLR module 200, an SDM storage 202, and an HSS module 204. NG HLR module 200 may include a communication interface and functionality for receiving and sending non-Diameter messages, such as MAP messages or other mobility management messages. For example, NG HLR module 200 may receive a MAP mobility management message and initiate or perform one or more actions. NG HLR module 200 may also include a proxy and/or conversion function. For example, NG HLR module 200 may be configured to convert Diameter messages to non-Diameter messages and/or receive non-Diameter messages from HSS module 204 or other sources. In this example, NG HLR module 200 may send or forward the non-Diameter messages to HLR 108 and receive responses from HLR 108. NG HLR module 200 may also be configured to convert non-Diameter messages to Diameter messages or send the messages to HSS module 204 or other destinations for conversion. NG HLR module 200 may store subscriber data and/or other information in SDM storage 202.

SDM storage 202 may be any suitable entity for storing subscriber data and/or other related information. For example, SDM storage 202 may store subscriber-related information, such as user identification, control information for user authentication and authorization, location information, and user profile data.

HSS module 204 may include a communication interface and functionality for receiving and sending Diameter messages, such as S6 messages or other mobility management messages. For example, HSS module 204 may receive a Diameter S6 mobility management message and initiate or perform one or more actions. HSS module 204 may also include a proxy and/or conversion function. For example, HSS module 204 may be configured to convert Diameter messages to non-Diameter messages and/or may send non-Diameter messages to NG HLR 200 for forwarding to HLR 208 or SGSN 106. HSS module 204 may also be configured to convert non-Diameter messages to Diameter messages and send the messages to MME 1 112, MME 2 114, or other nodes. HSS module 204 may store subscriber data and/or other information in SDM storage 202.

In some embodiments, NG HLR module 200 and/or HSS module 204 may determine whether to use an HLR proxy function based on an indicator or flag associated with a subscriber or a message associated with the subscriber. Using this indicator and/or other information, NG HLR module 200 and/or HSS module 204 may decide how to handle and/or facilitate actions associated with mobility management in Diameter and non-Diameter networks.

In scenarios where a subscriber has a non-Diameter (e.g., 3G) profile and a Diameter (e.g., 4G) profile provisioned in SDM storage 202, an HLR proxy mode flag associated with the subscriber may be set to false. By setting the HLR proxy mode flag to false, Diameter messages sent to HSS module 204 may be handled internally without requiring a proxy function to send corresponding messages to HLR 108 for processing. In such a scenario, non-Diameter messages received by HLR 108 may be sent to HSS 116 (or NG HLR module 200) for processing since subscriber data is handled by SDM storage 202.

In scenarios where a subscriber has a non-Diameter (e.g., 3G) profile provisioned at HLR 108 and a Diameter (e.g., 4G) profile provisioned in SDM storage 202, an HLR proxy mode flag associated with the subscriber may be set to true. By setting the HLR proxy mode flag to true, Diameter messages sent to HSS module 204 may be converted to non-Diameter messages and forwarded, by NG HLR 200, to HLR 108 for further processing. In such a scenario, non-Diameter messages may be sent from HLR 108 to HSS 116 (or NG HLR module 200) since HSS 116 may appear as a typical SGSN to HLR 108. HSS 116, or modules therein, may convert the received messages from HLR 108 and/or send the messages from HLR 108 to other nodes for facilitating or effecting various mobility management related actions.

It will be appreciated that the above description is for illustrative purposes and that HSS 116 may include additional and/or different modules or components. For example, SDM storage 202 may be two or more distinct memories and each may include different subscriber data.

Figure 3:
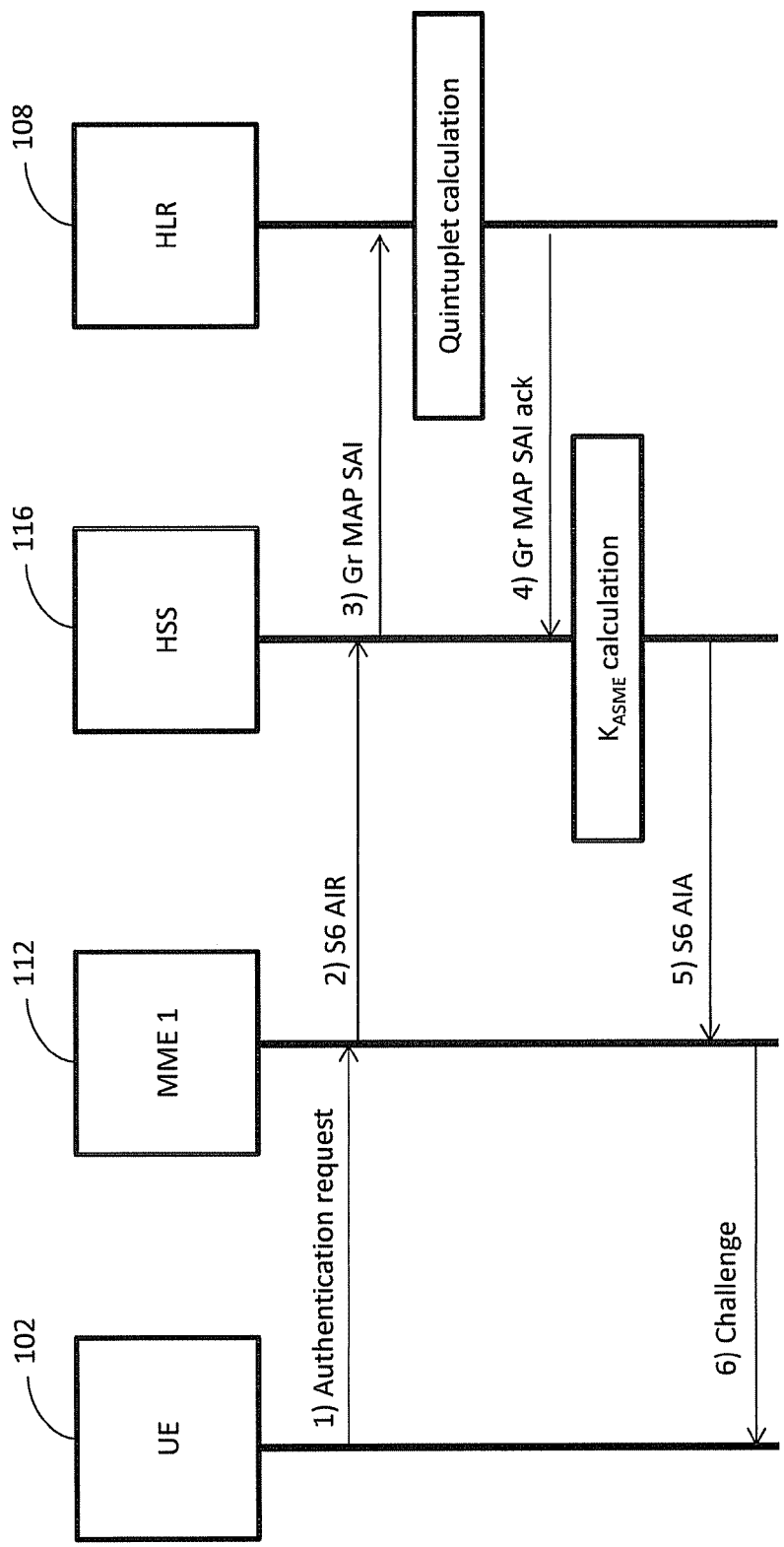
FIG. 3 is a diagram illustrating exemplary authentication procedure according to an embodiment of the subject matter described herein.

FIG. 3 is a diagram illustrating an exemplary authentication procedure according to an embodiment of the subject matter described herein. In some embodiments, HSS 116 may be configured to interact with HLR 108 when performing actions associated with an authentication procedure. For example, HSS 116 may use an authentication center for providing authentication vectors associated with UE 102. The authentication center may be located internally (e.g., at SDM storage 202) or externally (e.g., at HLR 108).

In the exemplary embodiment depicted in FIG. 3, a subscriber's SIM card may be provisioned as an offboard SIM type. An offboard SIM type may indicate that a SIM card or subscriber data associated with a SIM card is hosted externally at HLR 108. To perform an LTE authentication procedure for a UE associated with an offboard SIM type, HSS 116, or modules therein, may forward an authentication request to HLR 108. HLR 108 may receive the authentication request and may respond with authentication vectors associated with the subscriber. HSS 116 may receive the authentication vectors and perform additional processing to complete the authentication procedure. A more detailed message sequence is described below.

At step 1, an authentication request is sent from UE 102 to MME 1 112. The authentication request may be part of an attach procedure for using the network. MME 1 112 may receive the authentication request and may generate a Diameter message in response. The Diameter message may be for requesting authentication information associated with the subscriber or UE 102.

At step 2, a Diameter S6 authentication information request (AIR) message may be sent from MME 1 112 to HSS 116. The AIR message may be for requesting authentication information for the subscriber or UE 102. HSS 116 may receive the AIR message and determine that HLR 108 has the relevant authentication information for UE 102. For example, the AIR message may include an attribute value pair (AVP) or other information (e.g., an HLR proxy mode flag) for indicating that the subscriber is provisioned at HLR 108. HSS 116, or a module therein, may generate one or more non-Diameter messages (e.g., a Cr interface MAP send authentication info (SAI) message) based on the AIR message to retrieve the relevant authentication information from HLR 108.

In some embodiments, HSS 116 may send non-Diameter messages while acting as a proxy and such actions may be transparent to HLR 108. For example, HSS 116 may appear as an SGSN to HLR 108.

At step 3, a Gr MAP SAI message may be sent from HSS 116 to HLR 108. The Gr MAP SAI message may be for requesting authentication information from HLR 108. HLR 108 may receive the Gr MAP SAI message and provide the authentication information to HSS 116.

In some embodiments, HLR 108 may perform a quintuplet calculation and/or other actions to compute or retrieve authentication vectors prior to providing the authentication information.

At step 4, a Gr MAP SAI acknowledgement (ack) message may be sent from HLR 108 to HSS 116. The ack message may include the authentication information (e.g., authentication vectors). HSS 116 may receive the ack message and generate a Diameter message. The Diameter message may include authentication information received from HLR 108 and/or additional information.

In some embodiments, prior to generating Diameter message to MME 1 112, HSS 116, or a module therein, may compute a key access security management entity (KASME) parameter using authentication information received from HLR 108. The KASME parameter may be usable for authentication in E-UTRAN 110.

In some embodiments, HSS 116 may perform an LTE authentication procedure without requesting subscriber data (e.g., authentication vectors) from HLR 108. For example, a subscriber's SIM card may be provisioned as an onboard SIM type, such as a SIM or USIM type. An onboard SIM type may indicate that subscriber data associated with UE 102 is hosted at HSS 116. In this example, LTE 116 may perform an LTE authentication procedure by using an internal authentication center (e.g., stored at SDM storage 202), thereby avoiding the need to communicate with HLR 108.

At step 5, a Diameter S6 authentication information answer (AIA) message may be sent from HSS 116 to MME 1 112. The AIA message may include authentication information and/or a KASME parameter. MME 1 112 may receive the AIA message and generate a challenge message.

At step 6, a challenge message may be sent from MME 1 112 to UE 102. UE 102 may answer the challenge message to complete authentication and/or attachment to E-UTRAN 110.

In some embodiments, HSS 116 may perform an LTE authentication procedure without requesting subscriber data (e.g., authentication vectors) from HLR 108. For example, a subscriber's SIM card may be provisioned as an onboard SIM type, such as a SIM or USIM type. An onboard SIM type may indicate that subscriber data associated with UE 102 is hosted at HSS 116. In this example, HSS 116 may perform an LTE authentication procedure by using an internal authentication center (e.g., stored at SDM storage 202), thereby avoiding the need to communicate with HLR 108.

Figure 4:
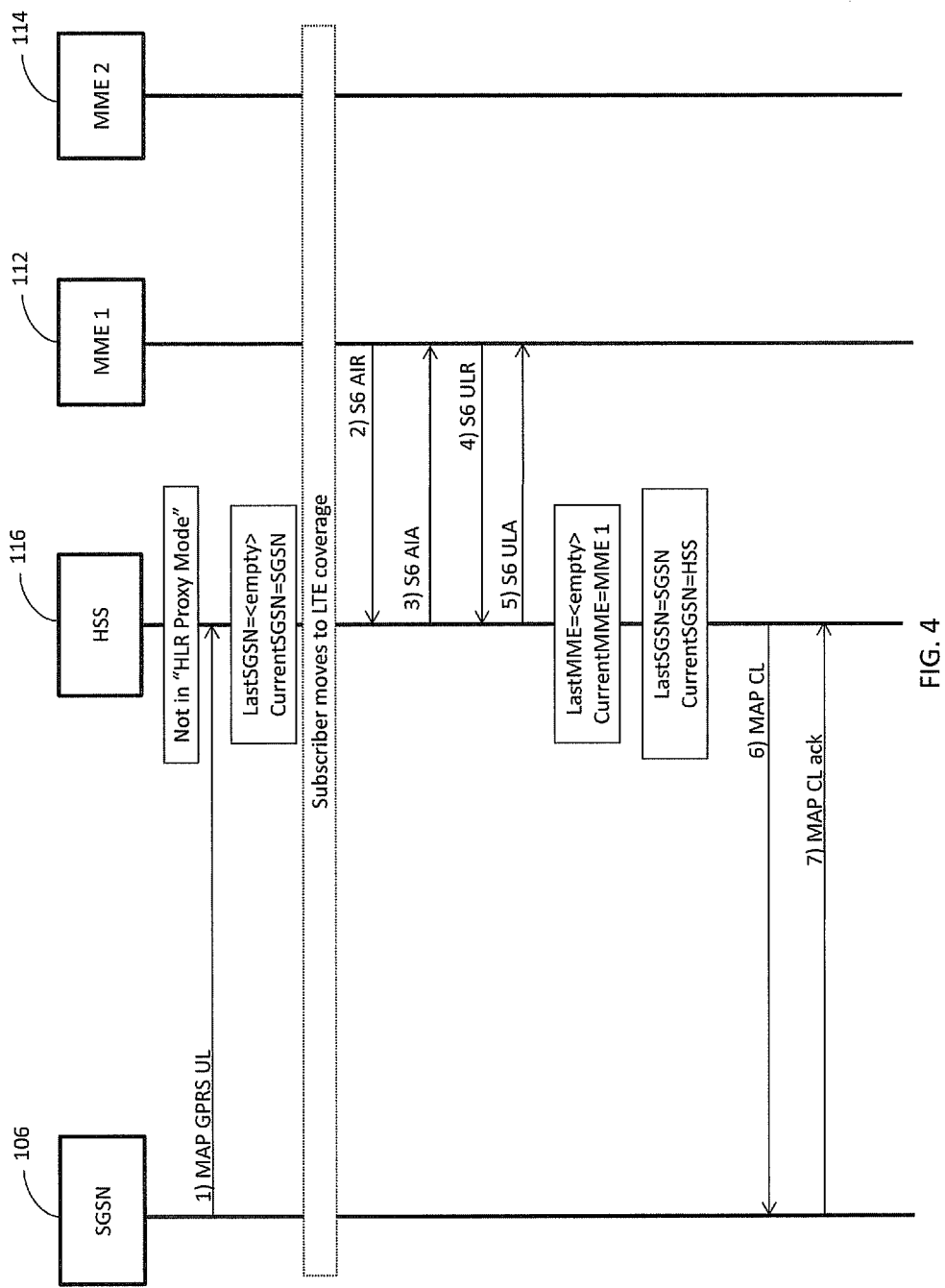
FIG. 4 is a diagram illustrating exemplary messages associated with an HSS-provisioned subscriber entering LTE coverage according to an embodiment of the subject matter described herein.

FIG. 4 is a diagram illustrating exemplary messages associated with an HSS-provisioned subscriber entering LTE coverage according to an embodiment of the subject matter described herein.

In the exemplary embodiment illustrated in FIG. 4, mobility management actions (e.g., an update location procedure) may be handled by HSS 116, e.g., internally between NG HLR module 200 and HSS module 204. For example, a parameter or other indicator (e.g., an HLR proxy mode flag) may be associated with a subscriber. The parameter or other indicator may indicate whether the subscriber is provisioned locally (e.g., at SDM storage 202). If a subscriber is provisioned locally (e.g., an HLR proxy mode flag is false), HSS 116 may avoid sending registration messages or other mobility management messages to HLR 108 and may handle the mobility management procedure(s) itself.

Prior to step 1, UE 102 may attempt to attach to UTRAN/GERAN 104 and SGSN 106 may initiate an update location procedure with HSS 116.

At step 1, a MAP GPRS update location (UL) message may be sent from SGSN 106 to HSS 116. HSS 116 may receive the message and determine that the subscriber is provisioned locally and/or that an HLR proxy mode flag is false. HSS 116, or modules therein, may update registration information associated with the subscriber. For example, NG HLR module 200 may receive the MAP GPRS UL message and, in response, may change subscriber registration information to indicate that SGSN 106 is the current serving node for UE 102.

Prior to step 2, UE 102 may move to a Diameter network. The Diameter network may be an LTE network and may use Diameter signaling messages for actions associated with mobility management. For example, UE 102 may attempt to attach to E-UTRAN 110 and MME 1 112 may initiate an authentication procedure and/or an update location procedure with HSS 116.

At step 2, a Diameter S6 AIR message may be sent from MME 1 112 to HSS 116. The AIR message may be for requesting authentication information for the subscriber or UE 102.

At step 3, a Diameter S6 AIA message may be sent from HSS 116 to MME 1 112. The AIA message may include authentication information and/or a KASME parameter. MME 1 112 may receive the AIA message and generate a challenge message. UE 102 may answer the challenge message to complete authentication and/or attachment to E-UTRAN 110. After a subscriber is authenticated, MME 1 112 may initiate or continue an update location procedure.

At step 4, a Diameter S6 update location request (ULR) message may be sent from MME 1 112 to HSS 116. The ULR message may include information for updating the current location of UE 102.

At step 5, a Diameter S6 update location answer (ULA) message may be sent from HSS 116 to MME 1 112. The ULA message may include subscriber data, such as policy and charging rules information. The ULA message may also indicate to MME 1 112 that the ULR message was received by HSS 116 and/or that the update location procedure, or a portion thereof, was completed.

In some embodiments, prior to, concurrently with, or after sending the ULA message, HSS 116 may update subscriber data associated with UE 102. For example, HSS 116, or a module therein (e.g., NG HLR module 200) may change subscriber registration information (e.g., SGSN identifiers) associated with a non-Diameter network. HSS 116, or a module therein (e.g., HSS module 204) may also change subscriber registration information (e.g., MME identifiers) associated with a Diameter network. In this example, HSS 116 may update registration information to indicate that MME 1 112 is the current serving node for UE 102 when using Diameter messages and that HSS 116 is the current serving node for UE 102 when using non-Diameter messages. Further in this example, HSS 116 may receive non-Diameter messages and convert the non-Diameter messages to corresponding Diameter messages before sending or forwarding the Diameter messages to MME 1 112.

In some embodiments, prior to, concurrently with, or after sending the ULA message, HSS 116 may initiate a cancel location procedure in the non-Diameter network.

At step 6, a MAP cancel location (CL) message may be sent from HSS 116 to SGSN 106. The MAP CL message may include information for triggering SGSN 106 to delete or remove subscriber data stored at SGSN 106.

At step 7, a MAP CL ack message may be sent from SGSN 106 to HSS 116. The MAP CL ack message may indicate to HSS 116 that the MAP CL message was received by SGSN 106 and/or that subscriber data associated with UE 102 was deleted.

Figure 5:
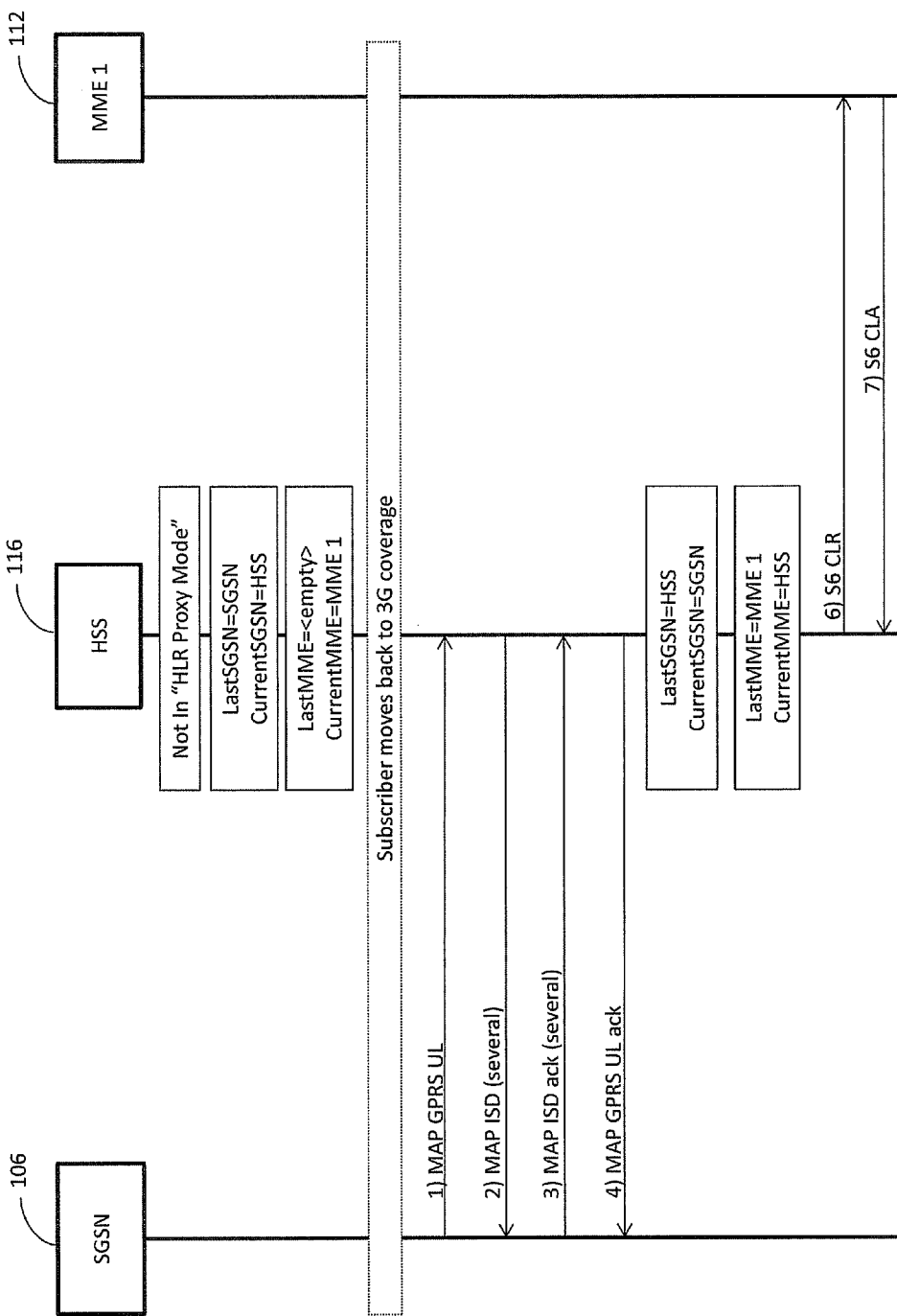
FIG. 5 is a diagram illustrating exemplary messages associated with an HSS-provisioned subscriber moving from LTE to 3G coverage according to an embodiment of the subject matter described herein.

FIG. 5 is a diagram illustrating exemplary messages associated with an HSS-provisioned subscriber moving from LTE to 3G coverage according to an embodiment of the subject matter described herein.

In the exemplary embodiment illustrated in FIG. 5, mobility management actions (e.g., an update location procedure) may be handled by HSS 116, e.g., internally between NG HLR module 200 and HSS module 204. For example, a parameter or other indicator (e.g., an HLR proxy mode flag) may be associated with a subscriber. The parameter or other indicator may indicate whether the subscriber is provisioned locally (e.g., at SDM data storage 202). If a subscriber is provisioned locally (e.g., an HLR proxy mode flag is false), HSS 116 may avoid sending registration messages or other mobility management messages to HLR 108 and may handle the mobility management procedure(s) itself.

In some embodiments, a subscriber or UE 102 may be associated with a home non-Diameter network and roaming in a Diameter network. For example, HSS 116 may include registration status data associated with the subscriber, including a current MME identifier and a last MME identifier. The current MME identifier may indicate that MME 1 112 is currently serving the subscriber and should receive any Diameter messages directed to the subscriber. The last MME identifier may indicate a preceding serving node associated with the subscriber. HSS 116 may also include additional registration status data associated with the subscriber, including a current SGSN identifier and a last SGSN identifier. The current SGSN identifier may indicate that HSS 116 (or NG HLR 200) is currently serving the subscriber and should receive any non-Diameter messages directed to the subscriber. For example, HSS 116 (or NG HLR 200) may receive non-Diameter messages and convert the non-Diameter messages to corresponding Diameter messages before sending or forwarding the Diameter messages to MME 1 112.

Prior to step 1, UE 102 may move from a visiting network to a home network. The home network may be a 3G network and may use non-Diameter signaling messages for actions associated with mobility management. UE 102 may attempt to attach to UTRAN/GERAN 104 and SGSN 106 may initiate an update location procedure with HSS 116.

At step 1, a MAP GPRS UL message may be sent from SGSN 106 to HSS 116. The MAP GPRS UL message may include information for updating the current location of UE 102. HSS 116 may receive the MAP GPRS UL message and use information in the message to retrieve subscriber data stored at SDM storage 202.

At step 2, one or more MAP ISD messages may be sent from HSS 116 to SGSN 106. The one or more ISD messages may include subscriber data, such as policy and charging rules information.

At step 3, one or more MAP ISD ack messages may be sent from SGSN 106 to HSS 116. The one or more MAP ISD ack messages may indicate to HSS 116 that the one or more ISD messages were received by SGSN 106.

At step 4, a MAP GPRS UL ack message may be sent from HSS 116 to SGSN 106. The ack message may indicate to SGSN 106 that the MAP GPRS UL message was received by HSS 116 and/or that the update location procedure was completed.

In some embodiments, prior to, concurrently with, or after sending the MAP GPRS UL ack message, HSS 116 may update subscriber data associated with UE 102. For example, HSS 116, or a module therein (e.g., NG HLR module 200) may change subscriber registration information (e.g., SGSN identifiers) associated with a non-Diameter network. HSS 116, or a module therein (e.g., HSS module 204), may also change subscriber registration information (e.g., MME identifiers) associated with a Diameter network. In this example, HSS 116 may update registration information to indicate that HSS 116 is the current serving node for UE 102 when using Diameter messages and that SGSN 106 is the current serving node for UE 102 when using non-Diameter messages. Further in this example, HSS 116 may receive Diameter messages and convert the Diameter messages to corresponding non-Diameter messages before sending or forwarding the Diameter messages to SGSN 106.

In some embodiments, prior to, concurrently with, or after sending the MAP GPRS UL ack message, HSS 116 may initiate a cancel location procedure in the Diameter network.

At step 6, a Diameter S6 cancel location request (CLR) message may be sent from HSS 116 to MME 1 112. The CLR message may include information for triggering MME 1 112 to delete or remove subscriber data stored at MME 1 112.

At step 7, a Diameter S6 cancel location answer (CLA) message may be sent from MME 1 112 to HSS 116. The S6 CLA message may indicate to HSS 116 that the S6 CLR message was received by MME 1 112 and/or that subscriber data associated with UE 102 was deleted.

Figure 6:
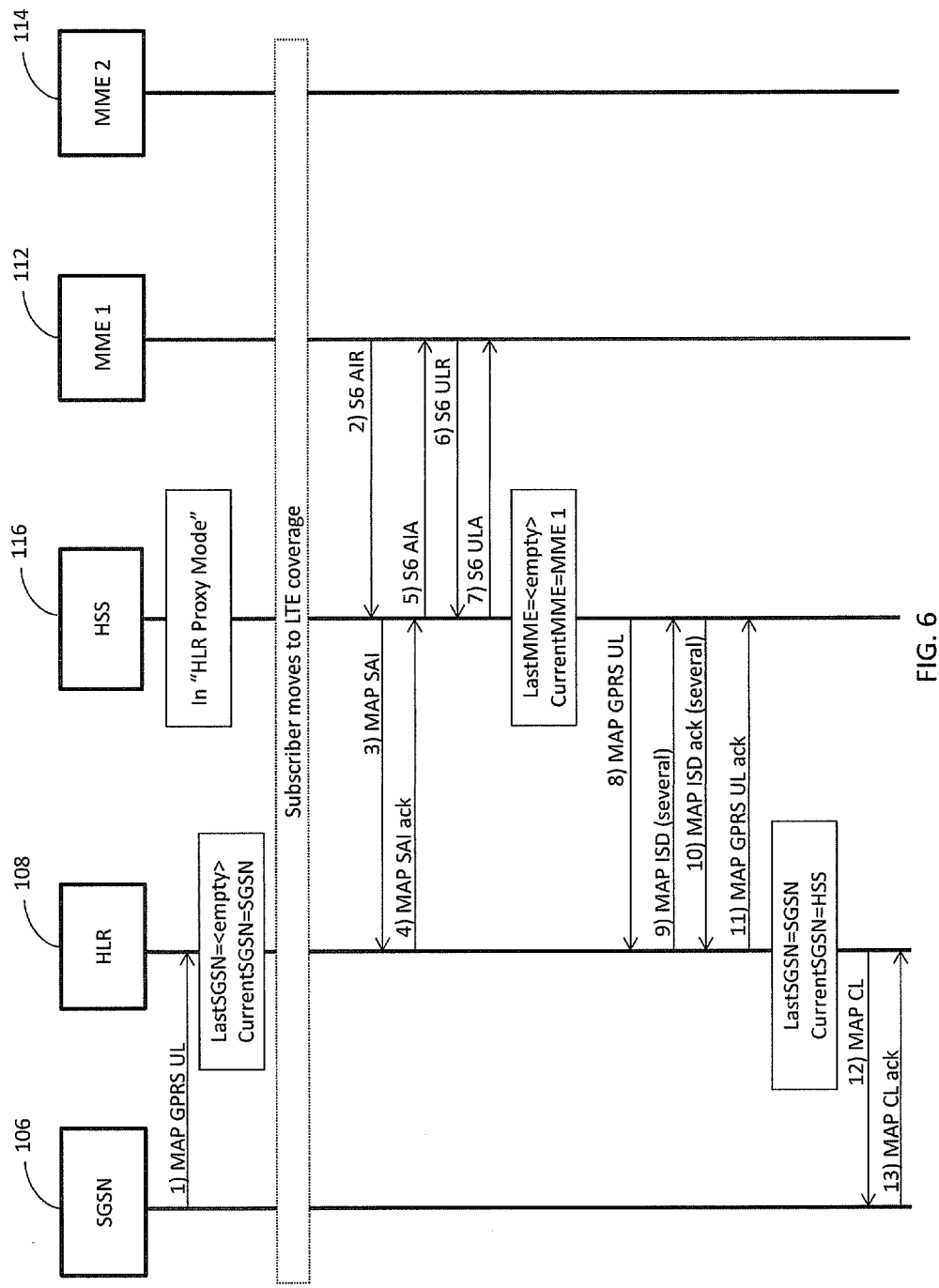
FIG. 6 is a diagram illustrating exemplary messages associated with an HLR-provisioned subscriber entering LTE coverage according to an embodiment of the subject matter described herein.

FIG. 6 is a diagram illustrating exemplary messages associated with an HLR-provisioned subscriber entering LTE coverage according to an embodiment of the subject matter described herein.

In the exemplary embodiment illustrated in FIG. 6, mobility management actions may be performed in conjunction with HLR 108. For example, an HLR proxy mode flag may be associated with a subscriber. The HLR proxy mode flag may indicate whether the subscriber is provisioned locally (e.g., at SDM storage 202) or externally (at HLR 108). If a subscriber is provisioned externally (e.g., an HLR proxy mode flag is true), the subscriber may be considered an HLR-provisioned subscriber.

In some embodiments, an HLR-provisioned subscriber may include a subscriber with subscriber data stored, managed, or handled by HLR 108. In some embodiments, HSS 116 may act as a proxy for HLR 108 and may convert Diameter messages to non-Diameter messages and forward the non-Diameter messages to HLR 108 so as to facilitate mobility management actions in a non-Diameter network. For example, HSS 116 may include an HLR proxy mode so as to forward mobility management messages to HLR 108.

Prior to step 1, UE 102 may attempt to attach to UTRAN/GERAN 104 and SGSN 106 may initiate an update location procedure with HLR 108.

At step 1, a MAP GPRS UL message may be sent from SGSN 106 to HLR 108. The MAP GPRS UL message may include information for updating the current location of UE 102. HLR 108 may receive the message and determine that the subscriber is provisioned locally (e.g., an HLR proxy mode is false). HLR 108 may update registration information associated with the subscriber. For example, HLR 108 may receive the MAP GPRS UL message and, in response, may change subscriber registration information to indicate that SGSN 106 is the current serving node for UE 102.

Prior to step 2, UE 102 may move to a Diameter network. The Diameter network may be an LTE network and may use Diameter signaling messages for actions associated with mobility management. For example, UE 102 may attempt to attach to E-UTRAN 110 and MME 1 112 may initiate an authentication procedure and/or an update location procedure with HSS 116.

At step 2, a Diameter S6 AIR message may be sent from MME 1 112 to HSS 116. The AIR message may be for requesting authentication information for the subscriber or UE 102. HSS 116 may receive the AIR message and determine that HLR 108 has the relevant authentication information for UE 102. HSS 116 may generate a non-Diameter message based on the AIR message to retrieve the relevant authentication information from HLR 108.

At step 3, a Gr MAP SAI message may be sent from HSS 116 to HLR 108. The Gr MAP SAI message may be for requesting authentication information from HLR 108. HLR 108 may receive the Or MAP SAI message and provide the authentication information to HSS 116.

At step 4, a Gr MAP SAI ack message may be sent from HLR 108 to HSS 116. The ack message may include the authentication information (e.g., authentication vectors). HSS 116 may receive the ack message and generate a Diameter message. The Diameter message may include authentication information received from HLR 108 and/or additional information, such as a computed KASME parameter.

At step 5, a Diameter S6 AIA message may be sent from HSS 116 to MME 1 112. The AIA message may include authentication information and/or a KASME parameter. MME 1 112 may receive the AIA message and generate a challenge message. UE 102 may answer the challenge message to complete authentication and/or attachment to E-UTRAN 110. After a subscriber is authenticated, MME 1 112 may initiate or continue an update location procedure.

At step 6, a Diameter S6 ULR message may be sent from MME 1 112 to HSS 116. The ULR message may include information for updating the current location of UE 102.

At step 7, a Diameter S6 ULA message may be sent from HSS 116 to MME 1 112. The ULA message may include subscriber data, such as policy and charging rules information. The ULA message may also indicate to MME 1 112 that the ULR message was received by HSS 116 and/or that the update location procedure, or a portion thereof, was completed.

In some embodiments, prior to, concurrently with, or after sending the ULA message, HSS 116 may update subscriber data associated with UE 102. For example, HSS 116, or a module therein (e.g., HSS module 204) may change subscriber registration information (e.g., MME identifiers). In this example, HSS 116 may update registration information to indicate that MME 1 112 is the current serving node for UE 102 when using Diameter messages.

At step 8, a MAP GPRS UL message may be sent from HSS 116 to HLR 108. The MAP GPRS UL message may include information for updating the current location of UE 102.

At step 9, one or more MAP ISD messages may be sent from HLR 108 to HSS 116. The one or more ISD messages may include subscriber data, such as policy and charging rules information.

At step 10, one or more MAP ISD ack messages may be sent from HSS 116 to HLR 108. The one or more MAP ISD ack messages may indicate to HLR 108 that the one or more ISD messages were received by HSS 116.

At step 11, a MAP GPRS UL ack message may be sent from HLR 108 to HSS 116. The ack message may indicate to HSS 116 that the MAP GPRS UL message was received by HLR 108 and/or that the update location procedure, or a portion thereof, was completed.

In some embodiments, prior to, concurrently with, or after sending the MAP GPRS UL ack message, HLR 108 may update subscriber data associated with UE 102. For example, HLR 108 may change subscriber registration information to indicate that HSS 116 is the current serving node for UE 102 and that SGSN 106 is the previously proceeding serving node.

At step 12, a MAP CL message may be sent from HLR 108 to SGSN 106. The MAP CL message may include information for triggering SGSN 106 to delete or remove subscriber data stored at SGSN 106.

At step 13, a MAP CL ack message may be sent from SGSN 106 to HLR 108. The MAP CL ack message may indicate to HLR 108 that the MAP CL message was received by SGSN 106 and/or that subscriber data associated with UE 102 was deleted.

Figure 7:
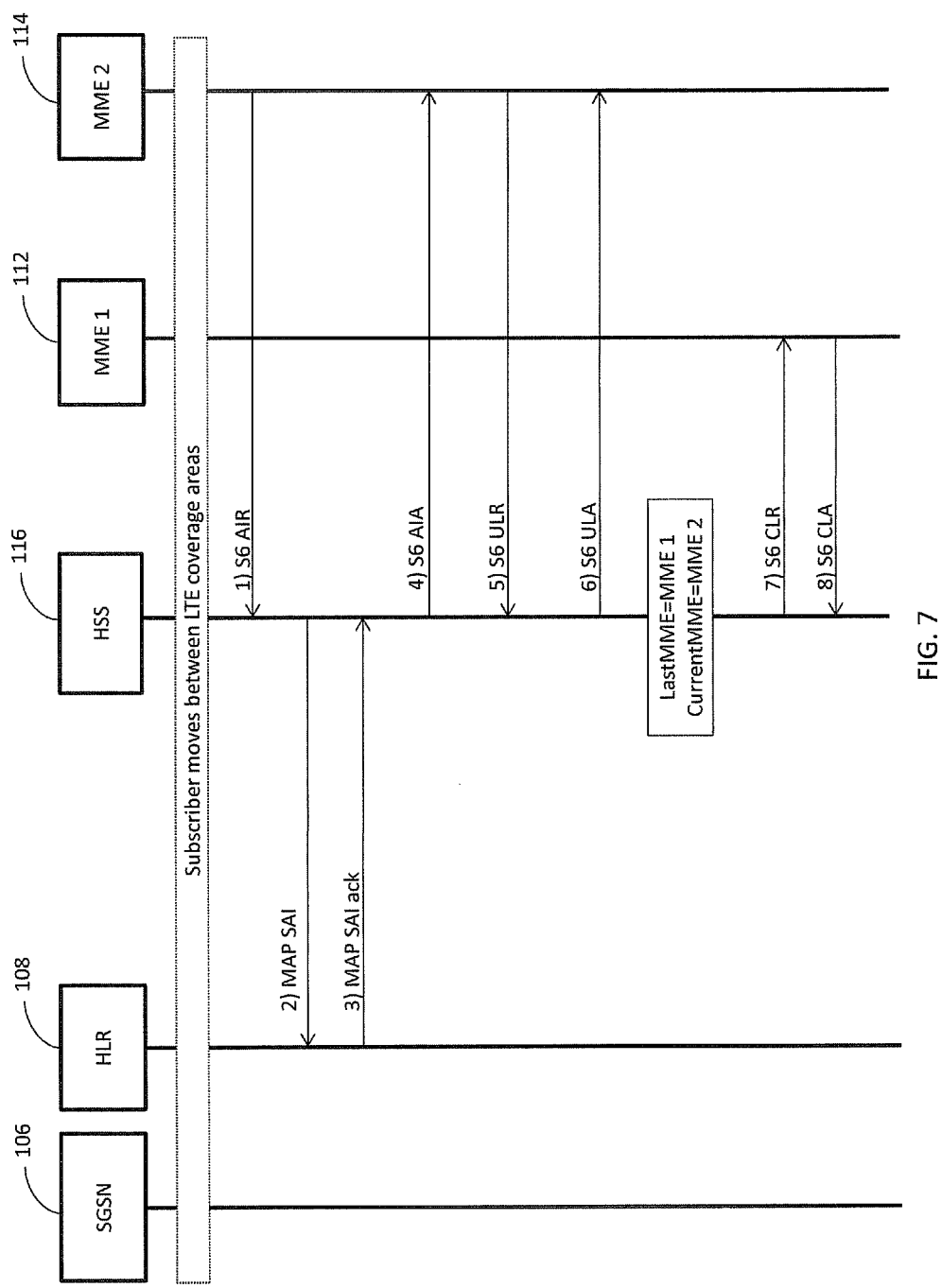
FIG. 7 is a diagram illustrating exemplary messages associated with an HLR-provisioned subscriber moving between LTE coverage areas according to an embodiment of the subject matter described herein.

FIG. 7 is a diagram illustrating exemplary messages associated with an HLR-provisioned subscriber moving between LTE coverage areas according to an embodiment of the subject matter described herein.

In the exemplary embodiment illustrated in FIG. 7, mobility management actions may be performed in conjunction with HLR 108. For example, an HLR proxy mode flag may be associated with a subscriber. The HLR proxy mode flag may indicate whether the subscriber is provisioned locally (e.g., at SDM storage 202) or externally (at HLR 108). If a subscriber is provisioned externally (e.g., an HLR proxy mode flag is true), the subscriber may be considered an HLR-provisioned subscriber.

In some embodiments, an HLR-provisioned subscriber may include a subscriber with subscriber data stored, managed, or handled by HLR 108. In some embodiments, HSS 116 may act as a proxy for HLR 108 and may convert Diameter messages to non-Diameter messages and forward the non-Diameter messages to HLR 108 so as to facilitate mobility management actions in a non-Diameter network.

Prior to step 1, UE 102 may move from a first Diameter network to a second Diameter network. The second Diameter network may be an LTE network and may use Diameter signaling messages for actions associated with mobility management. For example, UE 102 may attach to E-UTRAN 110 and MME 2 114 may initiate an authentication procedure and/or an update location procedure with HSS 116.

At step 1, a Diameter S6 AIR message may be sent from MME 2 114 to HSS 116. The AIR message may be for requesting authentication information for the subscriber or UE 102. HSS 116 may receive the AIR message and determine that HLR 108 has the relevant authentication information for UE 102. HSS 116 may generate a non-Diameter message that corresponds to the Diameter message. HSS 116 may send the generated non-Diameter message to HLR 108 for retrieving relevant authentication information.

At step 2, a Or MAP SAI message may be sent from HSS 116 to HLR 108. The Or MAP SAI message may be for requesting authentication information from HLR 108. HLR 108 may receive the Or MAP SAI message and provide the authentication information to HSS 116.

At step 3, a Gr MAP SAI ack message may be sent from HLR 108 to HSS 116. The ack message may include the authentication information (e.g., authentication vectors). HSS 116 may receive the ack message and generate a Diameter message. The Diameter message may include authentication information received from HLR 108 and/or additional information, such as a computed KASME parameter.

At step 4, a Diameter S6 AIA message may be sent from HSS 116 to MME 2 114. The AIA message may include authentication information and/or a KASME parameter. MME 2 114 may receive the AIA message and generate a challenge message. UE 102 may answer the challenge message to complete authentication and/or attachment to E-UTRAN 110. After a subscriber is authenticated, MME 2 114 may initiate or continue an update location procedure.

At step 5, a Diameter S6 ULR message may be sent from MME 2 114 to HSS 116. The ULR message may include information for updating the current location of UE 102.

At step 6, a Diameter S6 ULA message may be sent from HSS 116 to MME 2 114. The ULA message may include subscriber data, such as policy and charging rules information. The ULA message may also indicate to MME 2 114 that the ULR message was received by HSS 116 and/or that the update location procedure, or a portion thereof, was completed.

In some embodiments, prior to, concurrently with, or after sending the ULA message, HSS 116 may update subscriber data associated with UE 102. For example, HSS 116, or a module therein (e.g., HSS module 204) may change subscriber registration information (e.g., MME identifiers). In this example, HSS 116 may update registration information to indicate that MME 2 114 is the current serving node for UE 102.

In some embodiments, prior to, concurrently with, or after sending the ULA message, HSS 116 may initiate a cancel location procedure in the first Diameter network.

At step 7, a Diameter S6 CLR message may be sent from HSS 116 to MME 1 112. The CLR message may include information for triggering MME 1 112 to delete or remove subscriber data stored at MME 1 112.

At step 8, a Diameter S6 CLA message may be sent from MME 1 112 to HSS 116. The S6 CLA message may indicate to HSS 116 that the S6 CLR message was received by MME 1 112 and/or that subscriber data associated with UE 102 was deleted.

Figure 8:
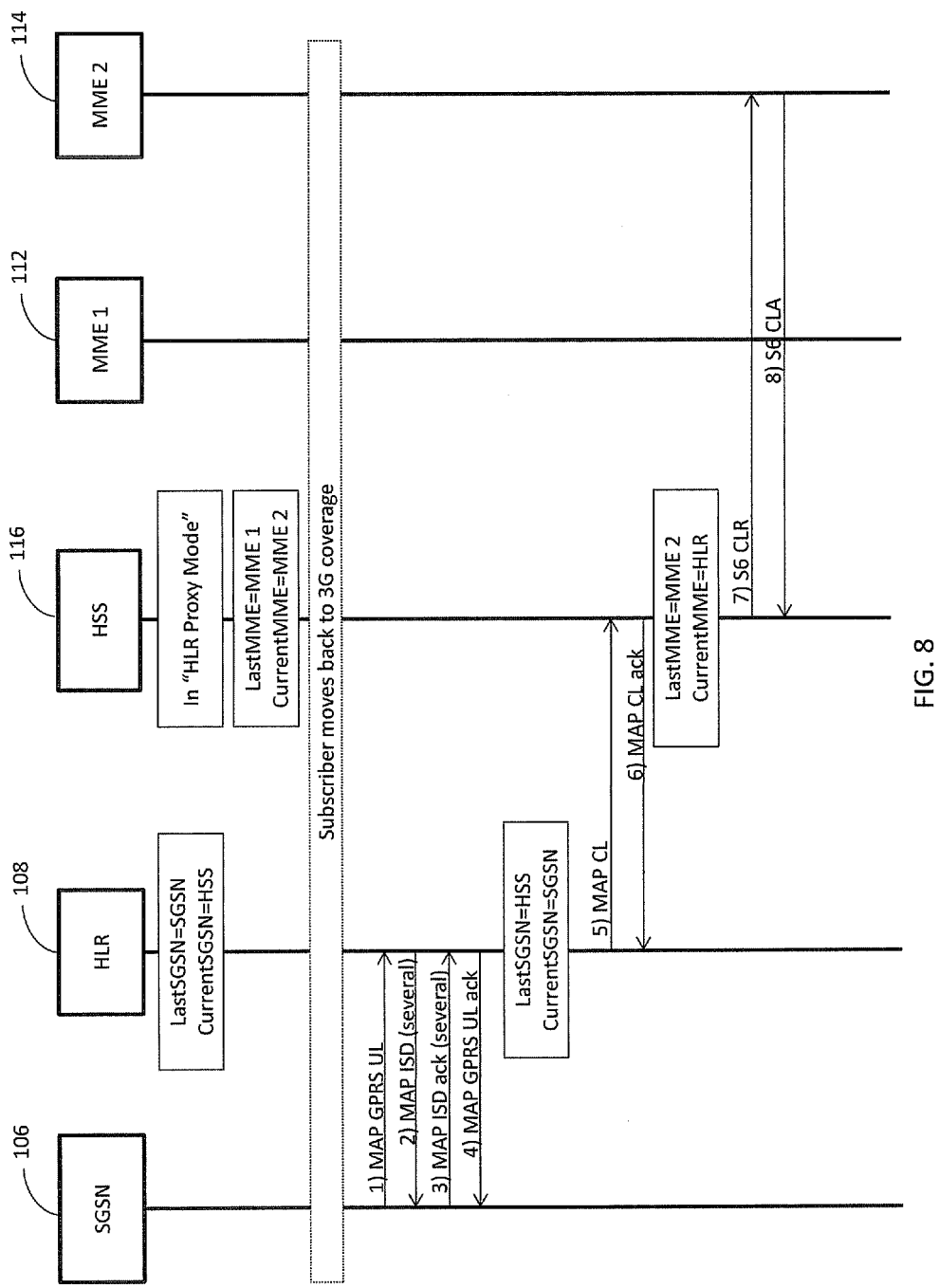
FIG. 8 is a diagram illustrating exemplary messages associated with an HLR-provisioned subscriber moving from LTE to 3G coverage according to an embodiment of the subject matter described herein.

FIG. 8 is a diagram illustrating exemplary messages associated with an HLR-provisioned subscriber moving from LTE to 3G coverage according to an embodiment of the subject matter described herein.

In the exemplary embodiment illustrated in FIG. 8, mobility management actions (e.g., an update location procedure) may be performed in conjunction with HLR 108. For example, an HLR proxy mode flag may be associated with a subscriber. The HLR proxy mode flag may indicate whether the subscriber is provisioned locally (e.g., at SDM storage 202) or externally (at HLR 108). If a subscriber is provisioned externally (e.g., an HLR proxy mode flag is true), the subscriber may be considered an HLR-provisioned subscriber.

In some embodiments, an HLR-provisioned subscriber may include a subscriber with subscriber data stored, managed, or handled by HLR 108. In some embodiments, HSS 116 may act as a proxy for HLR 108 and may convert Diameter messages to non-Diameter messages and forward the non-Diameter messages to HLR 108 so as to facilitate mobility management actions in a non-Diameter network. For example, HSS 116 may include an HLR proxy mode so as to forward mobility management messages to HLR 108.

In some embodiments, a subscriber or UE 102 may be associated with a home non-Diameter network and roaming in a Diameter network. In the visiting network, HSS 116 may include registration status data associated with the subscriber, including a current MME identifier and a last MME identifier. The current MME identifier may indicate that MME 1 112 is currently serving the subscriber and should receive any Diameter messages directed to the subscriber while in the visiting Diameter network. The last MME identifier may indicate a preceding serving node associated with the subscriber. In the home network, HLR 108 may include registration status data associated with the subscriber, including a current SGSN identifier and a last SGSN identifier. The current SGSN identifier may indicate that HSS 116 is currently serving the subscriber and should receive any non-Diameter messages directed to the subscriber while in the Diameter network. For example, HSS 116 may appear as an SGSN to HLR 108. The last SGSN identifier may indicate a preceding serving node associated with the subscriber.

Prior to step 1, UE 102 may move from a visiting network to a home network. The home network may be a 3G network and may use non-Diameter signaling messages for actions associated with mobility management. UE 102 may attempt to attach to UTRAN/GERAN 104 and SGSN 106 may initiate an update location procedure with HLR 108.

At step 1, a MAP GPRS UL message may be sent from SGSN 106 to HLR 108. The MAP GPRS UL message may include information for updating the current location of UE 102.

At step 2, one or more MAP ISD messages may be sent from HLR 108 to SGSN 106. The one or more ISD messages may include subscriber data, such as policy and charging rules information.

At step 3, one or more MAP ISD ack messages may be sent from SGSN 106 to HLR 108. The one or more MAP ISD ack messages may indicate to HLR 108 that the one or more ISD messages were received by SGSN 106.

At step 4, a MAP GPRS UL ack message may be sent from HLR 108 to SGSN 106. The ack message may indicate to SGSN 106 that the MAP GPRS UL message was received by HLR 108 and/or that the update location procedure, or a portion thereof, was completed.

In some embodiments, prior to, concurrently with, or after sending the MAP GPRS UL ack message, HLR 108 may update subscriber data associated with UE 102. For example, HLR 108 may change subscriber registration information to indicate that SGSN 106 is the current serving node for UE 102 and that HSS 116 is the previously proceeding serving node.

At step 5, a MAP CL message may be sent from HLR 108 to HSS 116. The MAP CL message may include information for triggering HSS 116 to delete, remove, or update subscriber data stored at HSS 116. The MAP CL message may also trigger HSS 116 to generate a Diameter message for initiating a cancel location procedure in the Diameter network.

At step 6, a MAP CL ack message may be sent from HSS 116 to HLR 108. The ack message may indicate to HLR 108 that the MAP CL message was received by HSS 116 and/or that the cancel location procedure, or a portion thereof, was completed.

In some embodiments, prior to, concurrently with, or after sending the MAP CL ack message, HSS 116, or a module therein, may update subscriber data associated with UE 102. For example, HSS 116 may change subscriber registration information to indicate that HLR 108 is the current serving node for UE 102 and that HSS 116 is the previously proceeding serving node.

In some embodiments, prior to, concurrently with, or after sending the MAP CL ack message, HSS 116, or a module therein, may generate and send one or more Diameter messages (e.g., via an S6 interface or another interface) to one or more nodes in a Diameter network for initiating, performing, or completing mobility management actions in the Diameter network.

At step 7, a Diameter S6 CLR message may be sent from HSS 116 to MME 2 114. The CLR message may include information for triggering MME 2 114 to delete or remove subscriber data stored at MME 2 114.

At step 8, a Diameter S6 CLA message may be sent from MME 2 114 to HSS 116. The S6 CLA message may indicate to HSS 116 that the S6 CLR message was received by MME 2 114 and/or that subscriber data associated with UE 102 was deleted.

Figure 9:
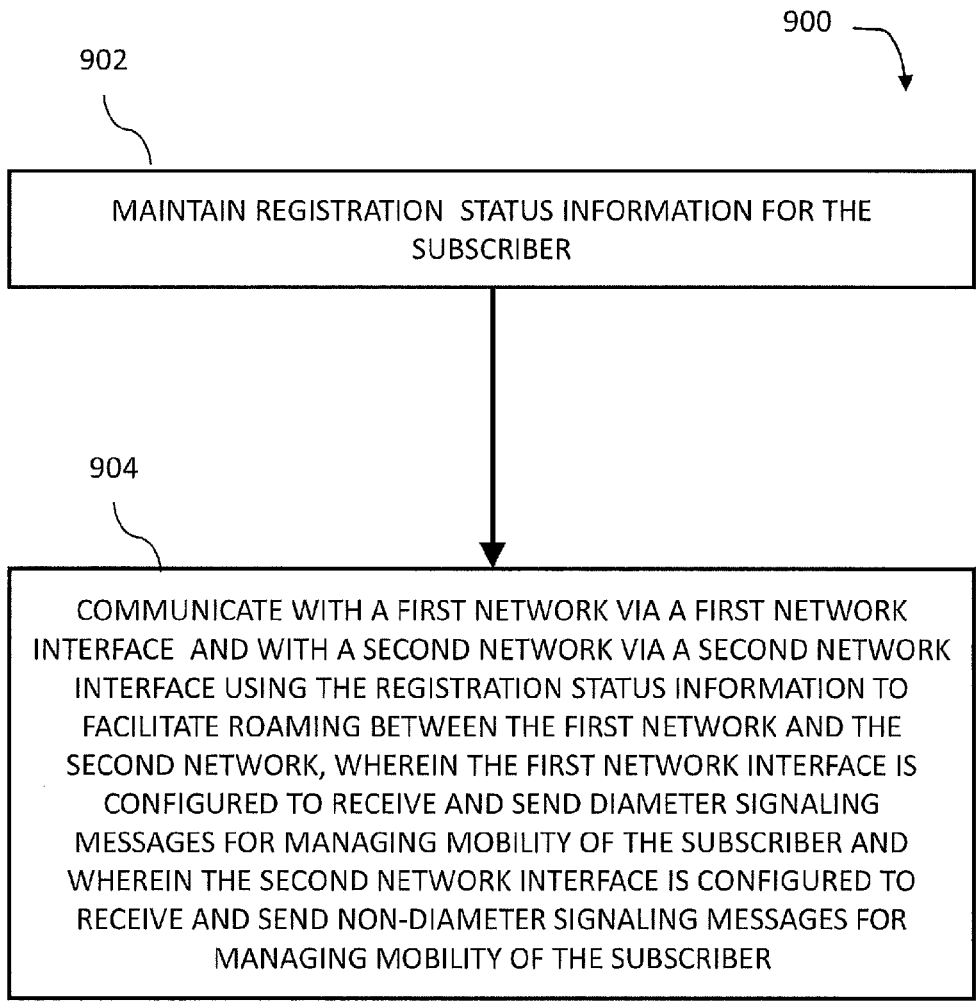
FIG. 9 is a flow chart illustrating an exemplary process for seamless roaming between networks according to an embodiment of the subject matter described herein.

FIG. 9 is a flow chart illustrating an exemplary process 900 for seamless roaming between networks according to an embodiment of the subject matter described herein. In some embodiments, exemplary process 900 described herein, or portions thereof, may be performed at or performed by HSS 116, NG HLR module 200, LTE HSS module 204, and/or another module or node.

Referring to the embodiment illustrated in FIG. 9, exemplary processor 900 starts at 902. At step 902, registration status information for a subscriber may be maintained. In some embodiments, maintaining registration status information may include updating or modifying an SGSN identifier or a MME identifier for indicating a node associated with the subscriber or UE 102.

At step 904, a first network via a first network interface and a second network via a second network interface may be communicated with using the registration status information to facilitate roaming between the first network and the second network. The first network interface may be configured to receive and send Diameter signaling messages for managing mobility of the subscriber. The second network interface may be configured to receive and send non-Diameter signaling messages for managing mobility of the subscriber.

In some embodiments, the first network may include E-UTRAN 110 and the second network may include UTRAN/GERAN 104.

In some embodiments, communicating with the first network via the first network interface may include receiving Diameter messages associated with mobility management from MME 112 or 114.

In some embodiments, communicating with the second network via the second network interface may include receiving non-Diameter messages associated with mobility management from SGSN 106.

In some embodiments, communicating with the second network via the second network interface may include communicating with HLR 108. For example, HLR 108 may maintain network subscription and registration information associated with the subscriber and HSS 116 may request subscriber information from HLR 108 for performing actions associated with mobility management in a Diameter network.

In some embodiments, HSS 116 may be configured to operate as a proxy for HLR 108, wherein HSS 116 performs actions associated with mobility management in the first network or the second network.

In some embodiments, the actions associated with mobility management may include an update location procedure, a cancel location procedure, an authentication procedure, a GPRS update location procedure, a GPRS cancel location procedure, sending or receiving an ISD message, sending or receiving a MAP message, or sending or receiving a Cr message, sending or receiving a Diameter message, sending or receiving a Diameter S6 message, sending a CLR message, receiving a CLA message, sending an AIR message, receiving an AIA message, sending a ULR message, or receiving a ULA message.

In some embodiments, communicating with a first network via a first network interface and with a second network via a second network interface using the registration status information to facilitate roaming between the first network and the second network may include converting Diameter messages associated with mobility management to non-Diameter messages associated with mobility management or converting non-Diameter messages associated with mobility management to Diameter messages associated with mobility management.

In some embodiments, communicating with a first network via a first network interface and with a second network via a second network interface using the registration status information to facilitate roaming between the first network and the second network may include receiving a Diameter message requesting authentication for the subscriber, sending a non-Diameter message for requesting authentication vectors from an HLR in the second network, computing a KASME parameter using the authentication vectors received from the HLR, or sending a Diameter message including the authentication vectors to a MME in the first network.

It will be appreciated that the above described messages sequences associated with FIGS. 3-9 are for illustrative purposes and additional and/or different messages may occur. Further, it will be appreciated that the order in which messages are received or sent may vary when effecting or facilitating mobility management in one or more networks.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for seamless roaming between networks, the method comprising:
  at a home subscriber server (HSS):
    maintaining registration status information for a subscriber; and
    communicating with a first network via a first network interface and with a second network via a second network interface using the registration status information to facilitate roaming between the first network and the second network, wherein the first network interface is configured to receive and send Diameter signaling messages for managing mobility of the subscriber and wherein the second network interface is configured to receive and send non-Diameter signaling messages for managing mobility of the subscriber, wherein the HSS is configured to compute a key access security management entity (KASME) parameter using authentication vectors received from the second network.

2. The method of claim 1 wherein maintaining registration status information includes storing a serving general packet radio service (GPRS) support node (SGSN) identifier or a mobility management entity (MME) identifier for indicating a node associated with the subscriber.

3. The method of claim 1 wherein communicating with the first network via the first network interface includes receiving Diameter messages associated with mobility management from a mobility management entity (MME).

4. The method of claim 1 wherein communicating with the second network via the second network interface includes receiving non-Diameter messages associated with mobility management from a serving general packet radio service (GPRS) support node (SGSN).

5. The method of claim 1 wherein communicating with the second network via the second network interface includes communicating with a home location register (HLR) that maintains network subscription and registration information associated with the subscriber.

6. The method of claim 1 wherein communicating with the second network via the second network interface includes operating the HSS as a proxy for a home location register (HLR), wherein the HSS performs actions associated with mobility management in the first network or the second network.

7. The method of claim 6 wherein the actions associated with mobility management include an update location procedure, a cancel location procedure, an authentication procedure, a general packet radio service (GPRS) update location procedure, a GPRS cancel location procedure, sending or receiving an insert subscriber data (ISD) message, sending or receiving a mobile application part (MAP) message, or sending or receiving a Gr message, sending or receiving a Diameter message, sending or receiving a Diameter S6 message, sending a cancel location request (CLR) message, receiving a cancel location answer (CLA) message, sending an authentication information request (AIR) message, receiving an authentication information answer (AIA) message, sending an update location request (ULR) message, or receiving an update location answer (ULA) message.

8. The method of claim 6 wherein communicating with a first network via a first network interface and with a second network via a second network interface using the registration status information to facilitate roaming between the first network and the second network includes converting Diameter messages associated with mobility management to non-Diameter messages associated with mobility management or converting non-Diameter messages associated with mobility management to Diameter messages associated with mobility management.

9. The method of claim 1 wherein communicating with a first network via a first network interface and with a second network via a second network interface using the registration status information to facilitate roaming between the first network and the second network includes receiving a Diameter message requesting authentication for the subscriber, sending a non-Diameter message for requesting authentication vectors from an home location register (HLR) in the second network, computing the KASME parameter using the authentication vectors received from the HLR, or sending a Diameter message including the authentication vectors to a mobility management entity (MME) in the first network.

10. The method of claim 1 wherein the first network includes an evolved universal mobile telecommunications system (UMTS) terrestrial radio access network (E-UTRAN) and the second network includes a UMTS terrestrial radio access network (UTRAN) or a global system for mobile communications (GSM) enhanced data rates for GSM evolution (EDGE) radio access network (GERAN).

11. A system for seamless roaming between networks, the system comprising:
a home subscriber server (HSS) comprising at least one processor and a memory, the HSS comprising:
a first network interface configured to receive and send Diameter signaling messages for managing mobility of the subscriber in a first network; and
a second network interface configured to receive and send non-Diameter signaling messages for managing mobility of the subscriber in a second network,
wherein the HSS is configured to maintain registration status information for a subscriber and to communicate with the first network via the first network interface and with the second network via the second network interface using the registration status information to facilitate roaming between the first network and the second network, wherein the HSS is configured to compute a key access security management entity (KASME) parameter using authentication vectors received from the second network.

12. The system of claim 11 wherein the HSS is configured to store a serving general packet radio service (GPRS) support node (SGSN) identifier or a mobility management entity (MME) identifier for indicating a node associated with the subscriber.

13. The system of claim 11 wherein the HSS is configured to receive Diameter messages associated with mobility management from a mobility management entity (MME).

14. The system of claim 11 wherein the HSS is configured to receive non-Diameter messages associated with mobility management from a serving general packet radio service (GPRS) support node (SGSN).

15. The system of claim 11 wherein the HSS is configured to communicate with a home location register (HLR) that maintains network subscription and registration information associated with the subscriber.

16. The system of claim 11 wherein the HSS is configured to operate as a proxy for a home location register (HLR), wherein the HSS performs actions associated with mobility management in the first network or the second network.

17. The method of claim 6 wherein the actions associated with mobility management include an update location procedure, a cancel location procedure, an authentication procedure, a general packet radio service (GPRS) update location procedure, a GPRS cancel location procedure, sending or receiving an insert subscriber data (ISD) message, sending or receiving a mobile application part (MAP) message, or sending or receiving a Gr message, sending or receiving a Diameter message, sending or receiving a Diameter S6 message, sending a cancel location request (CLR) message, receiving a cancel location answer (CLA) message, sending an authentication information request (AIR) message, receiving an authentication information answer (AIA) message, sending an update location request (ULR) message, or receiving an update location answer (ULA) message.

18. The method of claim 6 wherein the HSS is configured to convert Diameter messages associated with mobility management to non-Diameter messages associated with mobility management or to convert non-Diameter messages associated with mobility management to Diameter messages associated with mobility management.

19. The system of claim 11 wherein the HSS is configured to receive a Diameter message requesting authentication for the subscriber, send a non-Diameter message for requesting authentication vectors from an home location register (HLR) in the second network, to compute the KASME parameter using the authentication vectors received from the HLR, or to send a Diameter message including the authentication vectors to a mobility management entity (MME) in the first network.

20. The system of claim 11 wherein the first network includes an evolved universal mobile telecommunications system (UMTS) terrestrial radio access network (E-UTRAN) and the second network includes a UMTS terrestrial radio access network (UTRAN) or a global system for mobile communications (GSM) enhanced data rates for GSM evolution (EDGE) radio access network (GERAN).

21. A non-transitory computer readable medium having stored thereon executable instructions that when executed by a processor of a computer control the computer to perform steps comprising:

at a home subscriber server (HSS):
  maintaining registration status information for a subscriber; and
  communicating with a first network via a first network interface and with a second network via a second network interface using the registration status information to facilitate roaming between the first network and the second network, wherein the first network interface is configured to receive and send Diameter signaling messages for managing mobility of the subscriber and wherein the second network interface is configured to receive and send non-Diameter signaling messages for managing mobility of the subscriber, wherein the HSS is configured to compute a key access security management entity (KASME) parameter using authentication vectors received from the second network.

* * * * *